US012575537B2

(12) United States Patent
Petersen et al.

(10) Patent No.: US 12,575,537 B2
(45) Date of Patent: Mar. 17, 2026

(54) ANIMAL WARMING DEVICE

(71) Applicant: FarrPro, Inc., Iowa City, IA (US)

(72) Inventors: Amos Isaac Petersen, Iowa City, IA (US); Steven James Hoff, Iowa City, IA (US); James Donald Riley, Iowa City, IA (US); Christian Loza, Iowa City, IA (US)

(73) Assignee: FARRPRO, INC., Iowa City, IA (US)

( * ) Notice: Subject to any disclaimer, the term of this patent is extended or adjusted under 35 U.S.C. 154(b) by 0 days.

(21) Appl. No.: 18/440,621

(22) Filed: Feb. 13, 2024

(65) Prior Publication Data

US 2024/0268332 A1 Aug. 15, 2024

Related U.S. Application Data

(60) Provisional application No. 63/445,114, filed on Feb. 13, 2023.

(51) Int. Cl.
A01K 1/00 (2006.01)

(52) U.S. Cl.
CPC .................................. A01K 1/0076 (2013.01)

(58) Field of Classification Search
CPC .................................................... A01K 1/0076
See application file for complete search history.

(56) References Cited

U.S. PATENT DOCUMENTS 1,197,343 A 9/1916 Charlesworth
1,205,332 A 11/1916 Damon 1,230,917 A 6/1917 Maurer
1,850,657 A 3/1932 Brower
1,900,342 A 3/1933 Hess
2,627,841 A * 2/1953 Johnson ................. A01K 1/035
119/302
2,732,826 A 1/1956 Dawson
3,028,097 A * 4/1962 Johnson .............. A01K 1/0218
165/47
3,196,834 A 7/1965 Hall
(Continued)

OTHER PUBLICATIONS

Translation of ES_2037604_B1 (Year: 1994).*
(Continued)

*Primary Examiner* — Monica L Perry
*Assistant Examiner* — Brittany A Lowery
(74) *Attorney, Agent, or Firm* — McKee, Voorhees & Sease, PLC

(57) ABSTRACT

In one or more arrangements, an animal warming device is provided having a platform assembly. The platform assembly includes a first plate having an opening. A heating element is operatively connected to the first plate adjacent the opening. A diffuser assembly is operatively connected to the first plate and configured to diffuse heat. A second plate is connected adjacent the left side of the first plate and a third plate is connected adjacent the right side of the first plate. The animal warming device is configured to be installed on a barrier of an animal housing facility by placing respective lips of the first plate, the second plate, and the third plate over a support member connected to the barrier such that the rear lip of the first plate, the second plate, and the third plate is positioned between the barrier and the support member.

19 Claims, 43 Drawing Sheets

(56)     References Cited

U.S. PATENT DOCUMENTS

| | | | | |
|---|---|---|---|---|
| 3,429,306 | A * | 2/1969 | Thompson | A01K 31/19 |
| | | | | 126/92 R |
| 4,292,929 | A * | 10/1981 | Tellers | A01K 1/035 |
| | | | | 392/416 |
| 5,167,003 | A | 11/1992 | Montanari | |
| 5,308,310 | A | 5/1994 | Roff | |
| 6,116,190 | A | 9/2000 | Kitt | |
| 6,500,111 | B1 | 12/2002 | Salmon | |
| 6,506,147 | B2 | 1/2003 | Eustace | |
| 6,880,188 | B1 | 4/2005 | Schmidt | |
| 6,893,390 | B1 | 5/2005 | Mackin | |
| 6,905,233 | B1 * | 6/2005 | Blumenfeld-Kesler | |
| | | | | F21V 25/00 |
| | | | | 362/377 |
| 7,153,285 | B2 | 12/2006 | Lauman | |
| 7,165,508 | B2 * | 1/2007 | Bryant | A01K 1/0218 |
| | | | | 119/446 |
| 9,408,282 | B1 | 8/2016 | Springer | |
| 9,778,605 | B2 | 10/2017 | Kabata | |
| 10,653,109 | B2 * | 5/2020 | Lefebvre | A01K 5/0275 |
| 2002/0096984 | A1 | 7/2002 | Konishi | |
| 2005/0235922 | A1 | 10/2005 | Bryant | |
| 2006/0079730 | A1 | 4/2006 | Getsla | |
| 2007/0221137 | A1 * | 9/2007 | Lareau | A01K 1/0218 |
| | | | | 119/503 |
| 2008/0266115 | A1 * | 10/2008 | Labrecque | A01K 1/0076 |
| | | | | 340/573.3 |
| 2009/0159011 | A1 | 6/2009 | Santo | |
| 2010/0222638 | A1 | 9/2010 | Chilton | |
| 2011/0124952 | A1 * | 5/2011 | Panicker | F01K 13/00 |
| | | | | 392/407 |
| 2015/0065787 | A1 | 3/2015 | Bohnen | |
| 2016/0030616 | A1 | 2/2016 | Nariyuki | |
| 2016/0309916 | A1 | 10/2016 | Pothen | |
| 2017/0047887 | A1 | 2/2017 | Hilliard | |
| 2017/0112094 | A1 * | 4/2017 | Labrecque | A01K 1/0076 |
| 2017/0135888 | A1 | 5/2017 | Wakabayashi | |
| 2020/0359591 | A1 * | 11/2020 | Petersen | H05B 3/44 |
| 2023/0140301 | A1 | 5/2023 | Petersen et al. | |
| 2023/0141546 | A1 | 5/2023 | Petersen et al. | |

OTHER PUBLICATIONS

Graphine Heat Film, Radiant Panel Technologies, https://radiantpaneltechnologies.com/products/graphene-heat-film/ (retrieved Jun. 10, 2024).

Heat Mats & Pads [online]. QC Supply, [retrieved on Jan. 18, 2023]. Retrieved from the Internet: <URL: https://www.qcsupply.com/farm-livestock/mats-flooring/heat-mats.html>.

Heat Pads [online]. Barn World, [retrieved on Jan. 18, 2023]. Retrieved from the Internet: <URL: https://www.barnworld.com/livestock-supplies/Heating-Pads/>.

Heat Pads [online]. Hog Slat, [retrieved on Feb. 7, 2023]. Retrieved from the Internet: <URL: https://www.hogslat.com/heat-pad-farrowing-piglet-swine>.

Vittetoe heat lamps products page—retrieved Oct. 25, 2021 from https://vittetoe.com/heat-lamps.

* cited by examiner

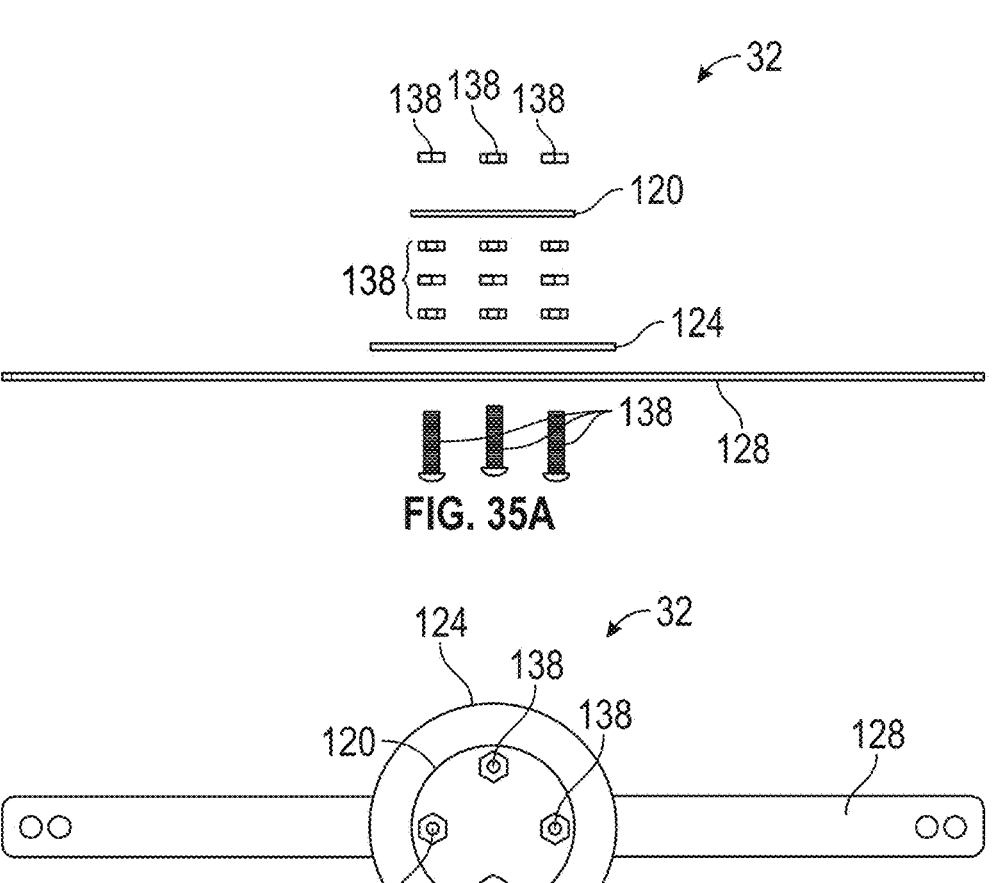
FIG. 35A
FIG. 35B
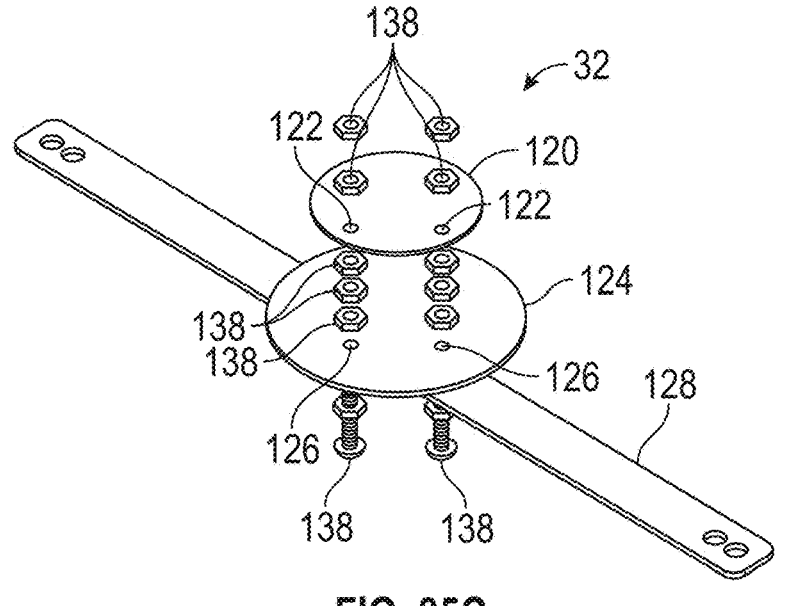
FIG. 35C

(Perspective View)

ANIMAL WARMING DEVICE

CROSS REFERENCE TO RELATED APPLICATIONS

This application claims priority to U.S. Provisional Patent Application 63/445,114 filed on Feb. 13, 2023 and titled Animal Warming Device, which is hereby incorporated by reference herein in its entirety, including any figures, tables, or drawings or other information.

FIELD OF THE DISCLOSURE

This disclosure relates generally to an animal warming device. More specifically, and without limitation, this disclosure relates generally to an animal warming device for use with heating systems for livestock.

OVERVIEW OF THE DISCLOSURE

Heating systems are used in modern agriculture to provide warmth for livestock in colder temperatures. For example, in farrowing of swine, it is frequently desirable to provide piglets with supplemental heat. Due to their high surface area to volume ratios, more external heat needs to be applied to the piglets than to the sow to keep all of the animals at the optimum temperature. Failure to provide piglets with sufficient external heat may lead to the death of some piglets from chilling. While piglets may lie against the sow for warmth, this increases the chances of the sow rolling over and suffocating or crushing the piglets.

Some heating systems for farrowing provide a farrowing crate with separate sow and piglet areas separated by a fence. The piglet area is provided with a heat lamp and/or heat mat to draw the piglets away from the sow to avoid injury or death associated with crushing. Providing separate heating elements for the piglet area draws and warms the piglets. The fence is provided with metal fingers or other barriers to allow the piglets to pass back and forth between the sow and piglet areas for feeding and heating, while preventing the sow from moving into the piglet area and crushing the piglets.

Livestock heating systems sometimes utilize heating elements such as heating mats and/or heating lamps to generate heat. Sometimes, only a single heating element is utilized per group of piglets. This is because previous systems do not have methods to organize and operate multiple heating elements for one group of animals or piglets. As such, if multiple heating elements are needed to keep the piglets warm, previous systems may not be able to accommodate the piglets' needs. Further, in previous systems, heating elements may concentrate heat in one area directly underneath the heating element, which may make a portion of that area too warm for piglets. Additionally, previous systems may be hard to clean if they are attached in one place and cannot rotate easily. Therefore, for all the reasons stated above, and the reasons stated below, there is a need in the art for an animal warming device that improves upon the state of the art. Thus, it is a primary object of the disclosure to provide an animal warming device that improves upon the state of the art.

Another object of the disclosure is to provide an animal warming device that is safe to use.

Yet another object of the disclosure is to provide an animal warming device that is less susceptible to damage and that can adapt to various livestock housing facilities.

Another object of the disclosure is to provide an animal warming device that can rotate so that it can be cleaned easily.

Yet another object of the disclosure is to provide an animal warming device that is configured for use in livestock operations.

Another object of the disclosure is to provide an animal warming device that is easy to deploy.

Yet another object of the disclosure is to provide an animal warming device that is easy to install.

Another object of the disclosure is to provide an animal warming device that has a long useful life.

Yet another object of the disclosure is to provide an animal warming device that is durable.

Another object of the disclosure is to provide an animal warming device that has a robust design.

Yet another object of the disclosure is to provide an animal warming device that is easy to use.

Another object of the disclosure is to provide an animal warming device that is high quality.

Yet another object of the disclosure is to provide an animal warming device that is easy to clean.

These and other objects, features, or advantages of the disclosure will become apparent from the specification, figures and claims.

SUMMARY OF THE DISCLOSURE

In one or more arrangements, an animal warming device is provided having a platform assembly. The platform assembly having a front side, a rear side, a left side and a right side, a top side and a bottom side. The platform assembly also having a first plate and the first plate having an opening. The animal warming device also includes a heating element wherein the heating element is operatively connected to the first plate adjacent the opening. The animal warming device also having a diffuser assembly operatively connected to the first plate adjacent the opening of the first plate. The diffuser assembly is configured to diffuse heat. The animal warming device also having a second plate connected adjacent the left side of the first plate and a third plate connected adjacent the right side of the first plate. The first plate, second plate, and third plate all having a front lip and a rear lip. Further, the animal warming device is configured to be installed on a barrier of an animal housing facility by placing the rear lip of the first plate, the second plate, and the third plate over a support member connected to the barrier such that the rear lip of the first plate, the second plate, and the third plate is positioned between the barrier and the support member.

In one or more arrangements, the animal warming device is configured to be installed on a barrier of an animal housing facility. Further, the animal warming device is configured to rotate between a deployed position (for use) and a raised position (for cleaning).

In one or more arrangements, the animal warming device is configured to be installed on a barrier of an animal housing facility by placing the rear lip of the first plate, the second plate and the third plate over a support member connected to the barrier such that when the animal warming device is in a deployed position, the rear lip of the first plate, the second plate and the third plate is wedged between the barrier and the support member.

In one or more arrangements, the first plate, second plate, and third plate of the animal warming device have a center section that is generally flat and planar in shape. Further, the rear lip of the first plate, the second plate and the third plate is generally flat and planar in shape, and the plane of the center section of the first plate, the second plate and the third plate extends approximately perpendicularly to the plane of rear lip of the first plate, the second plate and the third plate.

In one or more arrangements, the animal warming device also includes a corner plate. The corner plate having an opening. Wherein the heating element is operatively connected to the corner plate adjacent the opening. The animal warming device also having a diffuser assembly operatively connected to the corner plate adjacent the opening of the corner plate. The animal warming device also having a first plate connected to a side of the corner plate and a second plate connected to a side of the corner plate that is adjacent the side of the corner plate that the first plate is connected to. Wherein the corner plate has a rear lip and the first plate and second plate have a front lip and a rear lip. Further, the animal warming device is configured to be installed on a barrier of an animal housing facility by placing the rear lip of the corner plate, the first plate, and the second plate over a support member connected to the barrier such that the rear lip of the corner plate, the first plate, and the second plate is positioned between the barrier and the support member.

BRIEF DESCRIPTION OF THE DRAWINGS

FIG. 34C shows an upper side from perspective view of an example diffuser assembly for a platform assembly of an animal warming device to a barrier of an animal housing facility, in accordance with one or more arrangements.

FIG. 35A shows an exploded front view of an example diffuser assembly for a platform assembly of an animal warming device to a barrier of an animal housing facility, in accordance with one or more arrangements.

FIG. 35B shows an exploded top view of an example diffuser assembly for a platform assembly of an animal warming device to a barrier of an animal housing facility, in accordance with one or more arrangements.

FIG. 35C shows an exploded upper side from perspective view of an example diffuser assembly for a platform assembly of an animal warming device to a barrier of an animal housing facility, in accordance with one or more arrangements.

Figure 1:
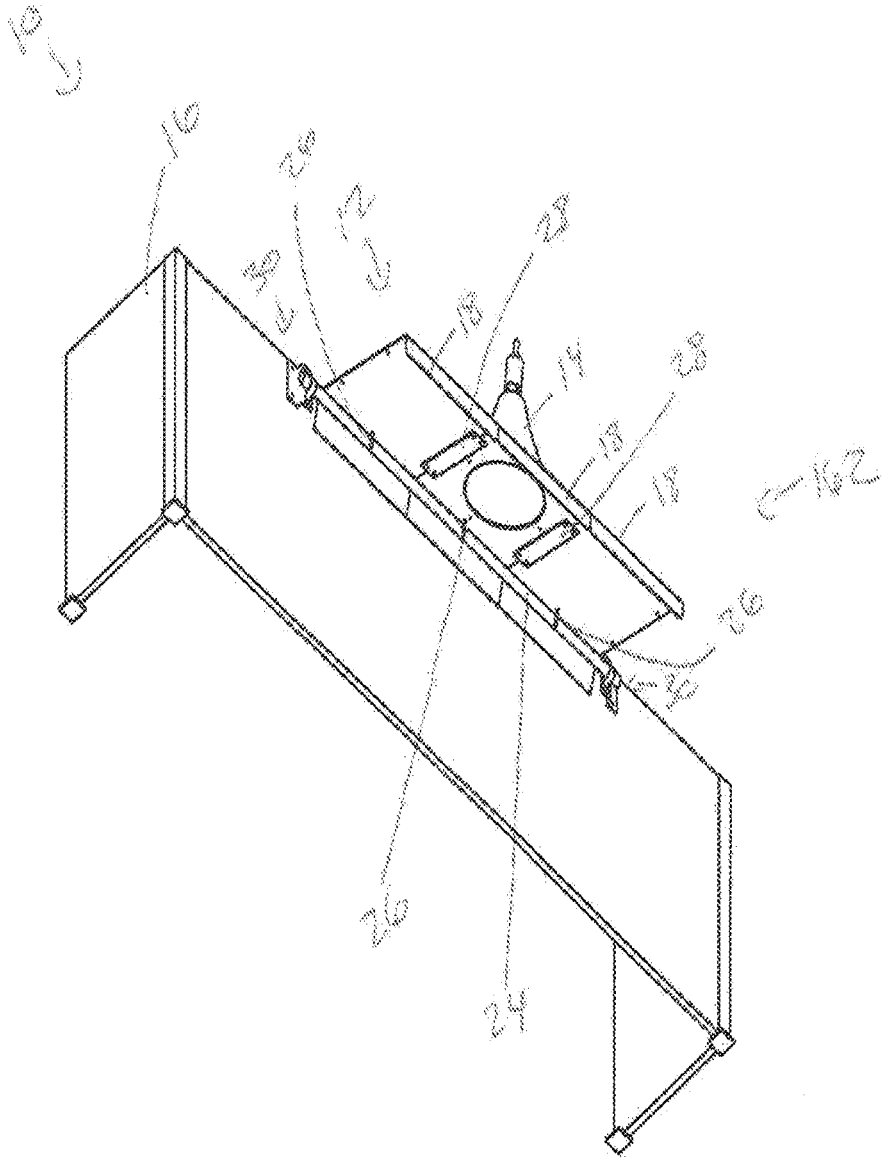
FIG. 1 shows a lower front right perspective view of an animal warming device, in accordance with one or more arrangements.
Figure 2:
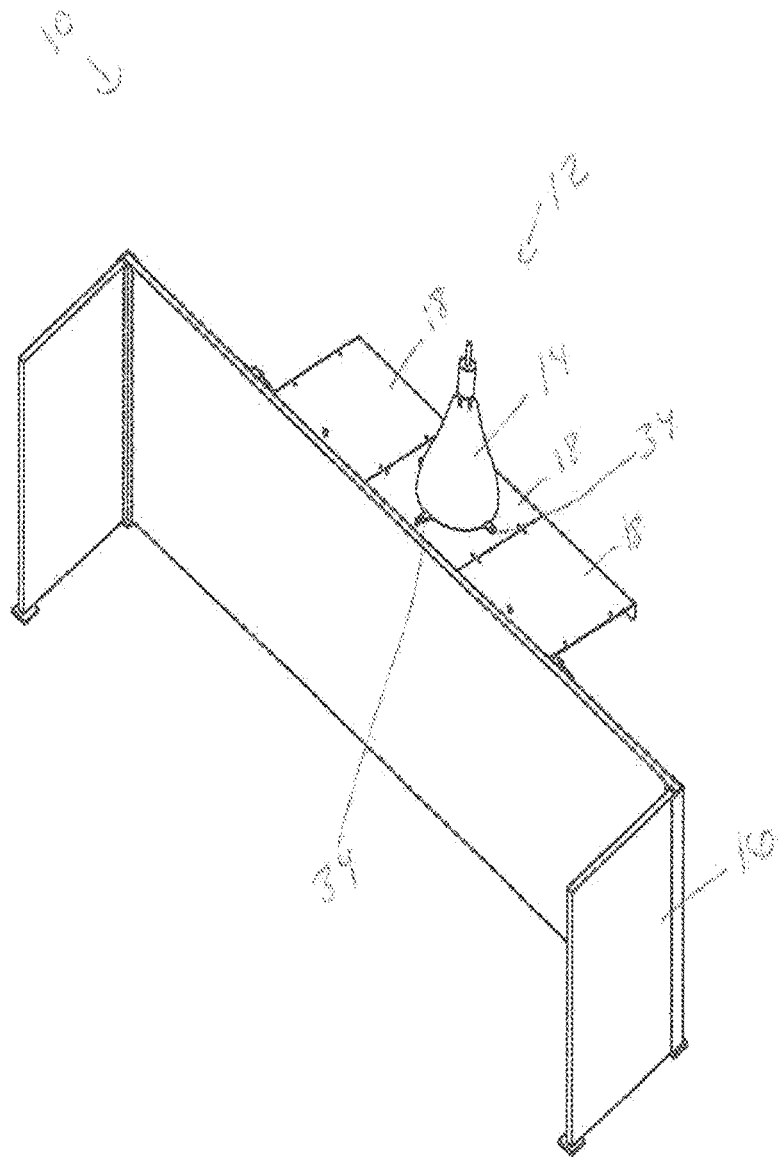
FIG. 2 shows an upper rear right perspective view of an animal warming device, in accordance with one or more arrangements.
Figure 3:
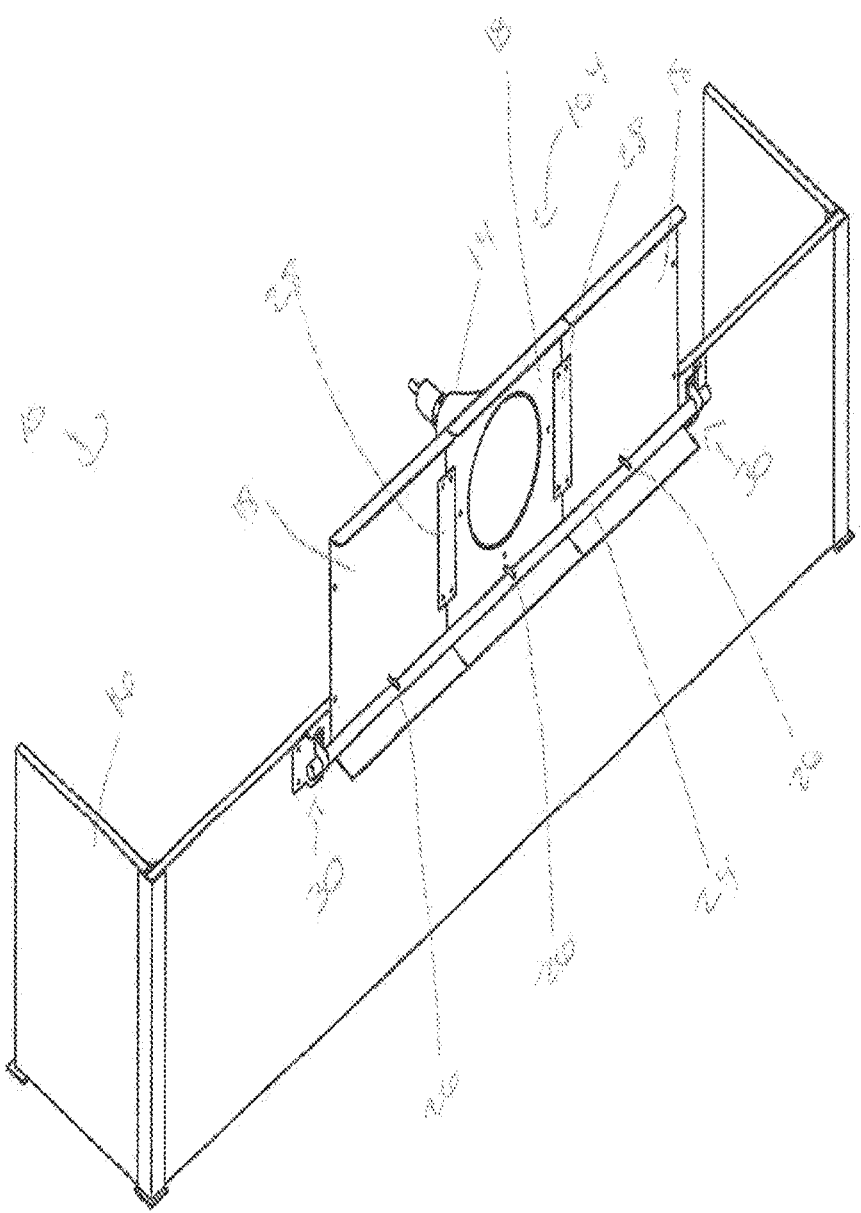
FIG. 3 shows an upper front right perspective view of an animal warming device, in accordance with one or more arrangements; the view showing a platform assembly of the animal warming device moved to an upward tilted position.
Figure 4:
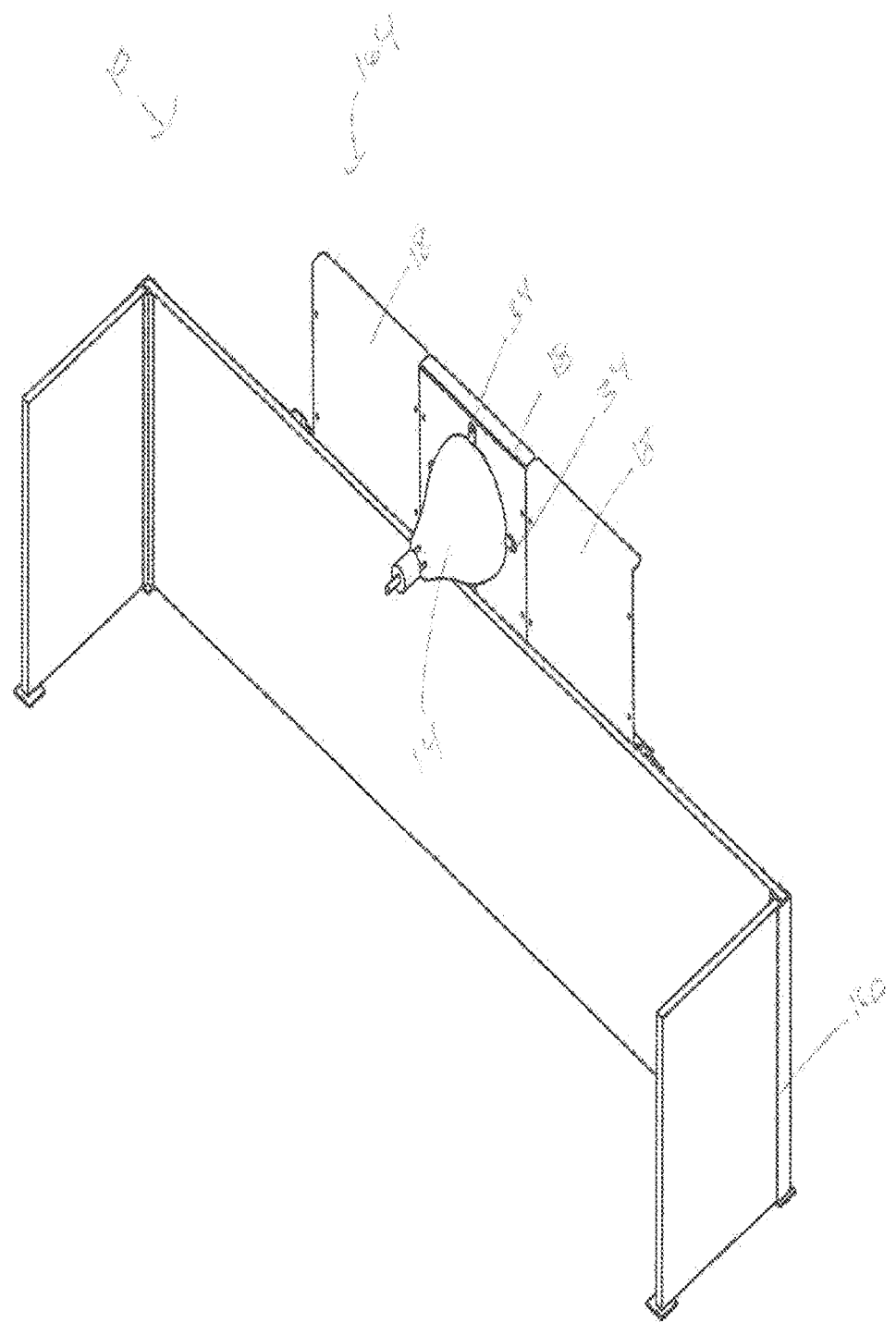
FIG. 4 shows an upper rear right perspective view of an animal warming device, in accordance with one or more arrangements; the view showing a platform assembly of the animal warming device moved to an upward tilted position.
Figure 5:
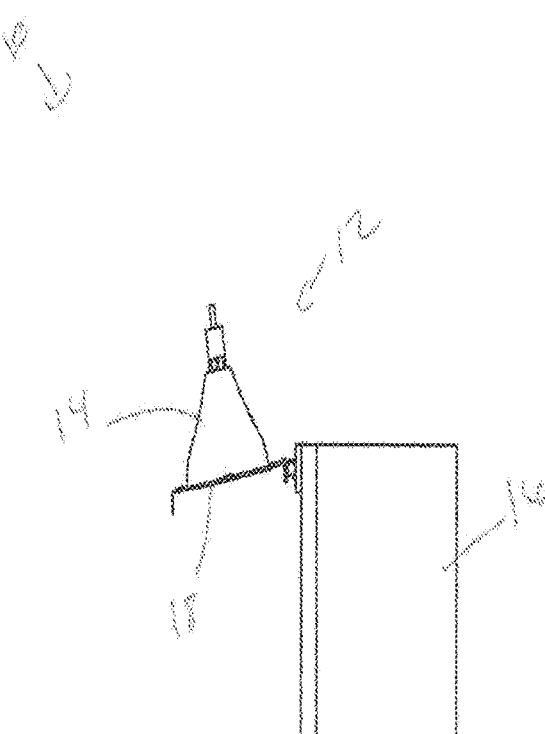
FIG. 5 shows a left side view of an animal warming device, in accordance with one or more arrangements.
Figure 6:
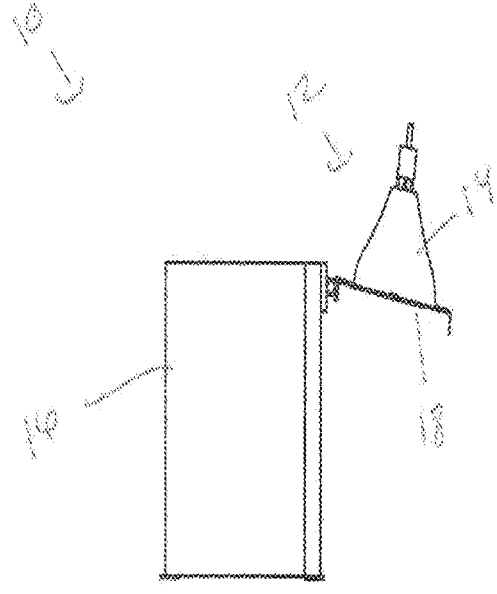
FIG. 6 shows a right side view of an animal warming device, in accordance with one or more arrangements.
Figure 7:
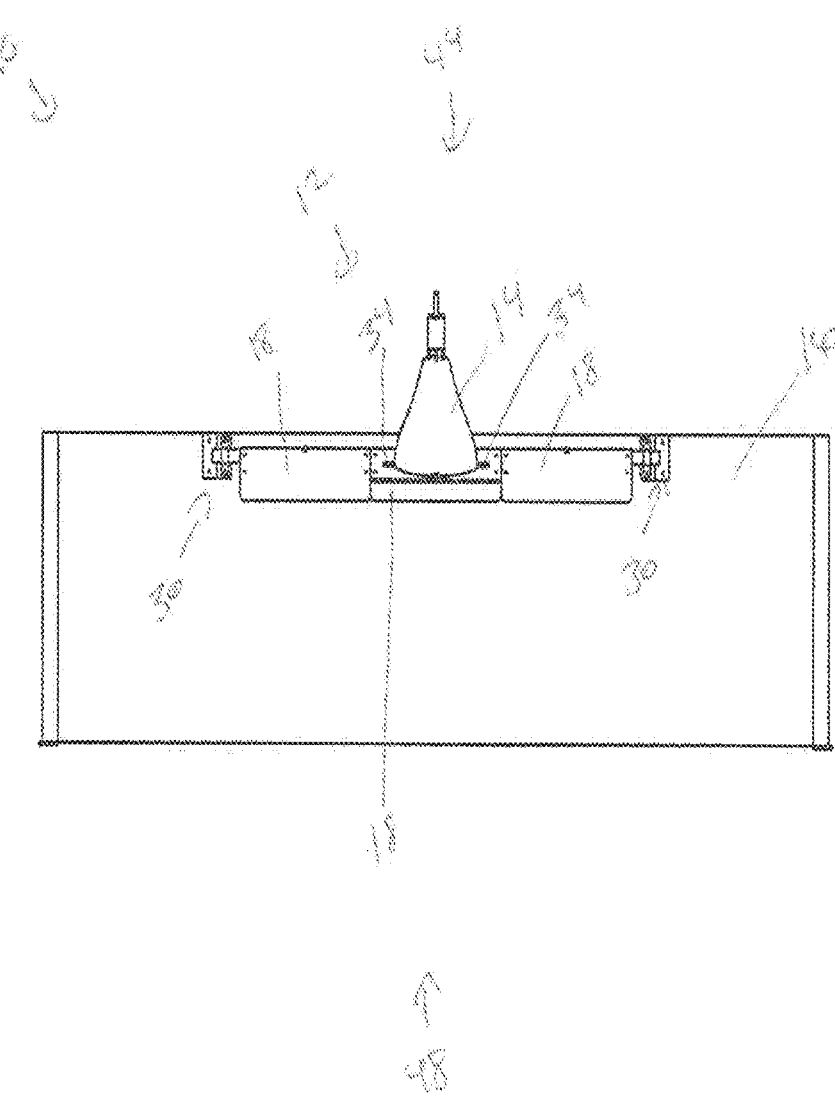
FIG. 7 shows a front view of an animal warming device, in accordance with one or more arrangements.
Figure 8:
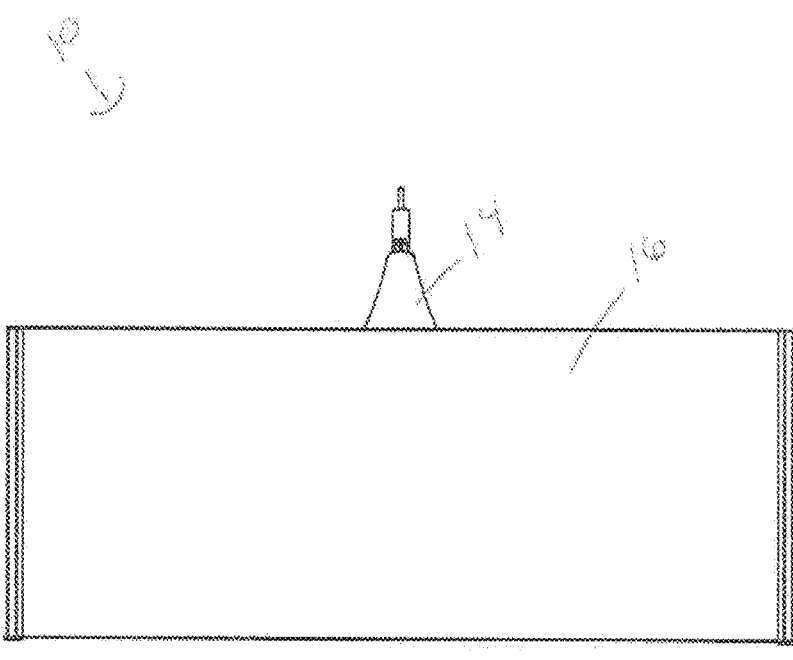
FIG. 8 shows a rear view of an animal warming device, in accordance with one or more arrangements.
Figure 9:
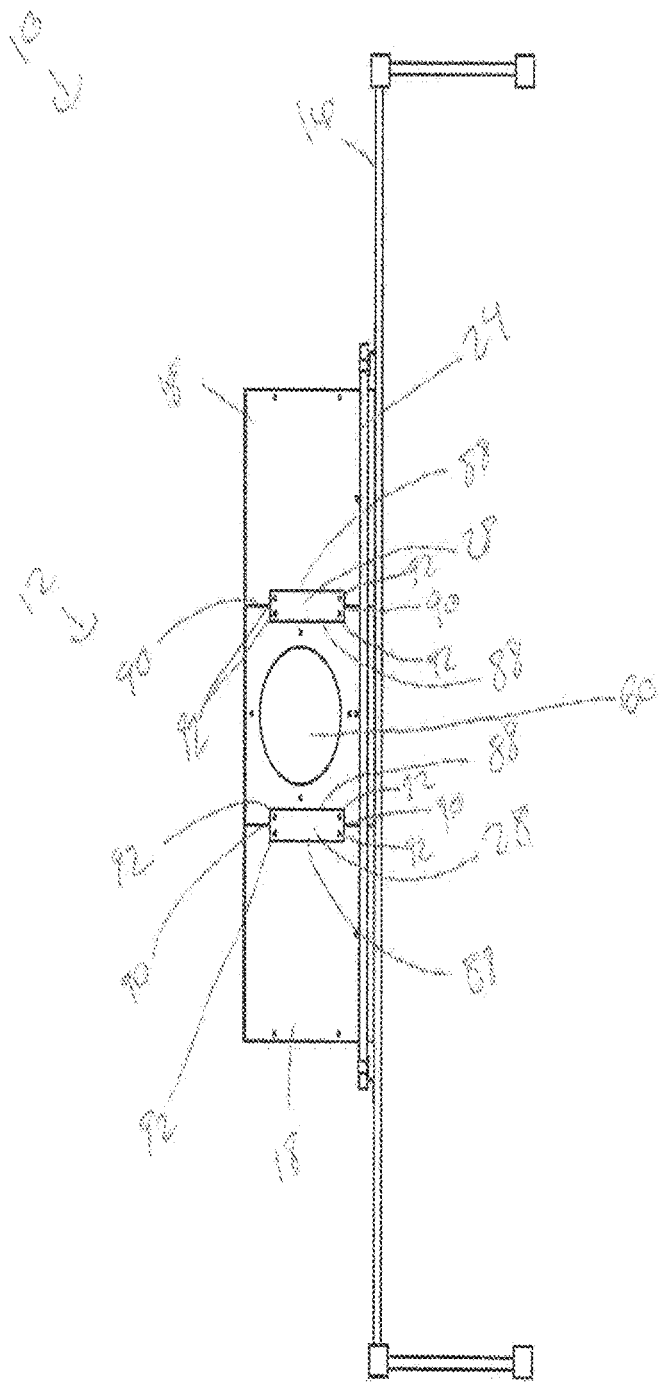
FIG. 9 shows a bottom view of an animal warming device, in accordance with one or more arrangements.
Figure 10:
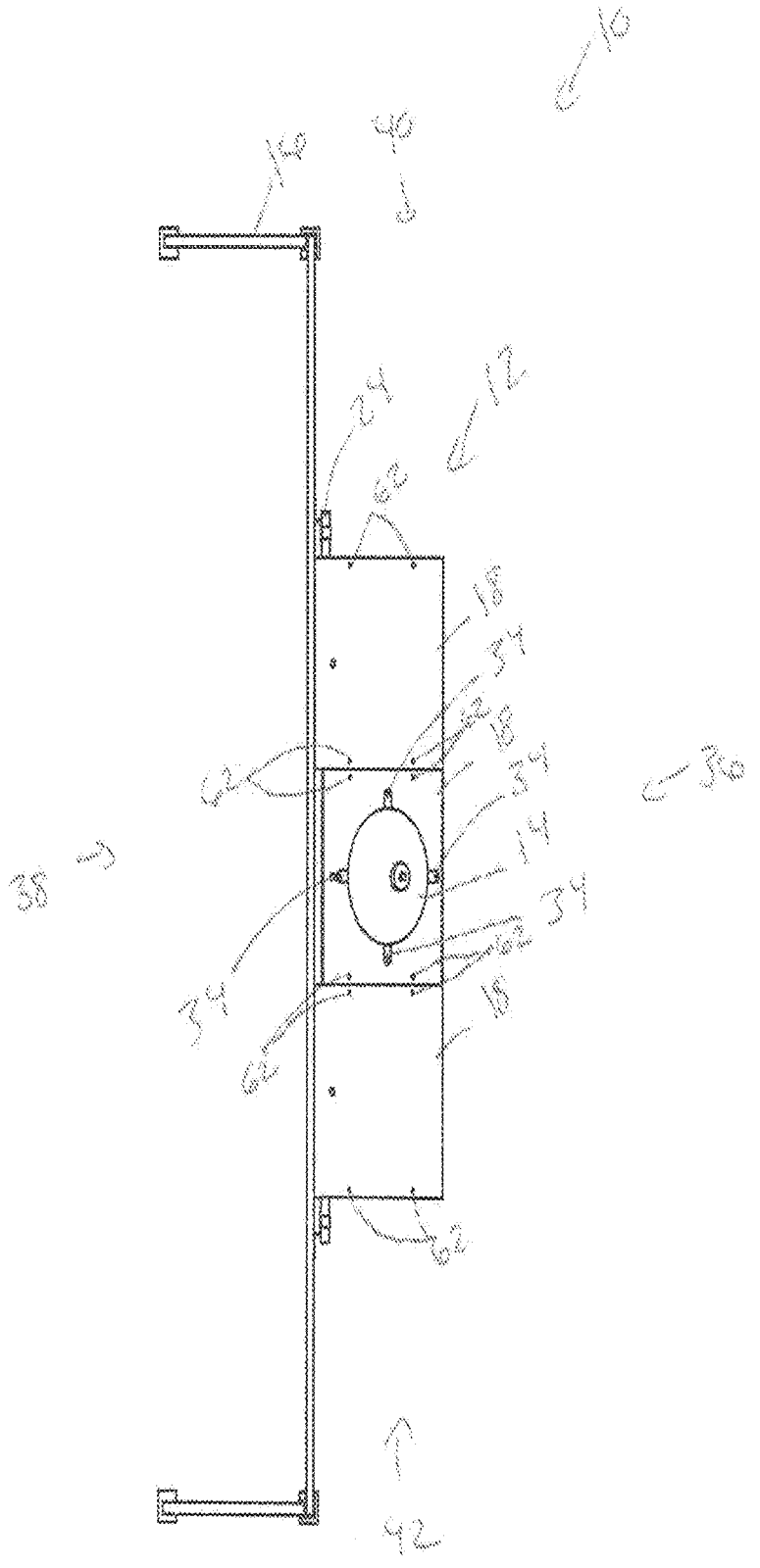
FIG. 10 shows a top view of an animal warming device, in accordance with one or more arrangements.
Figure 11:
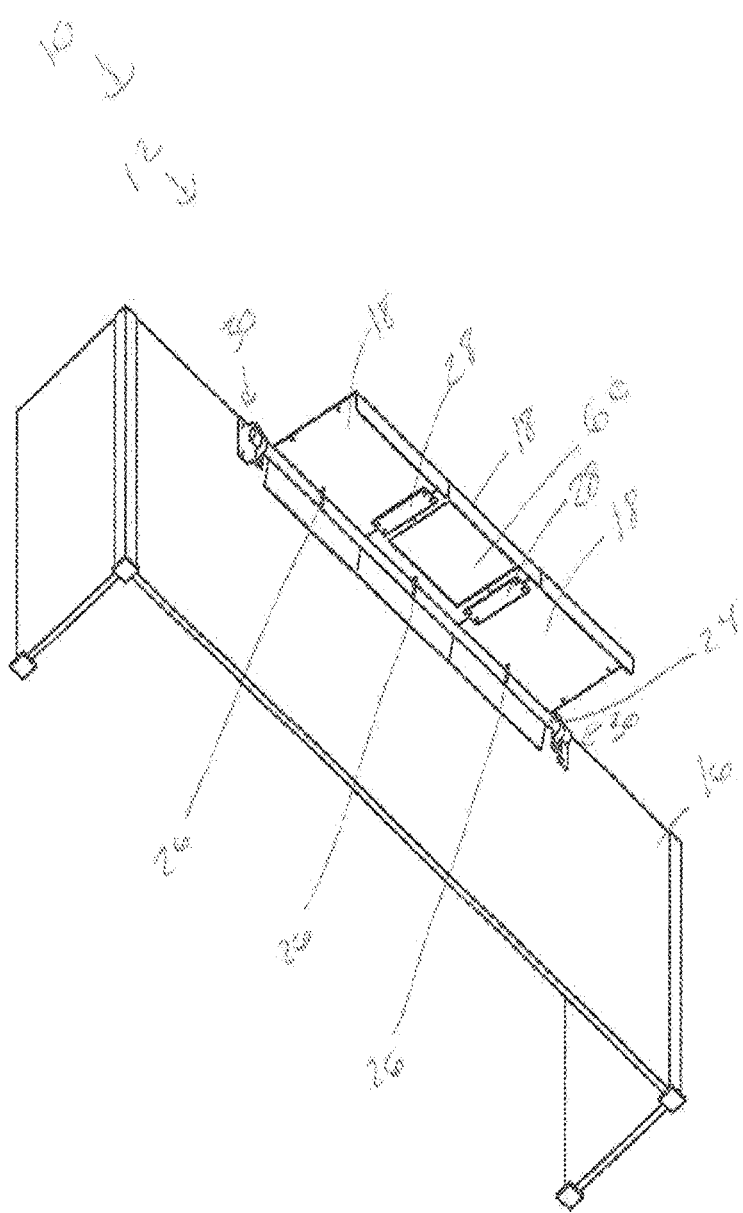
FIG. 11 shows a lower front right perspective view of an animal warming device, in accordance with one or more arrangements.
Figure 12:
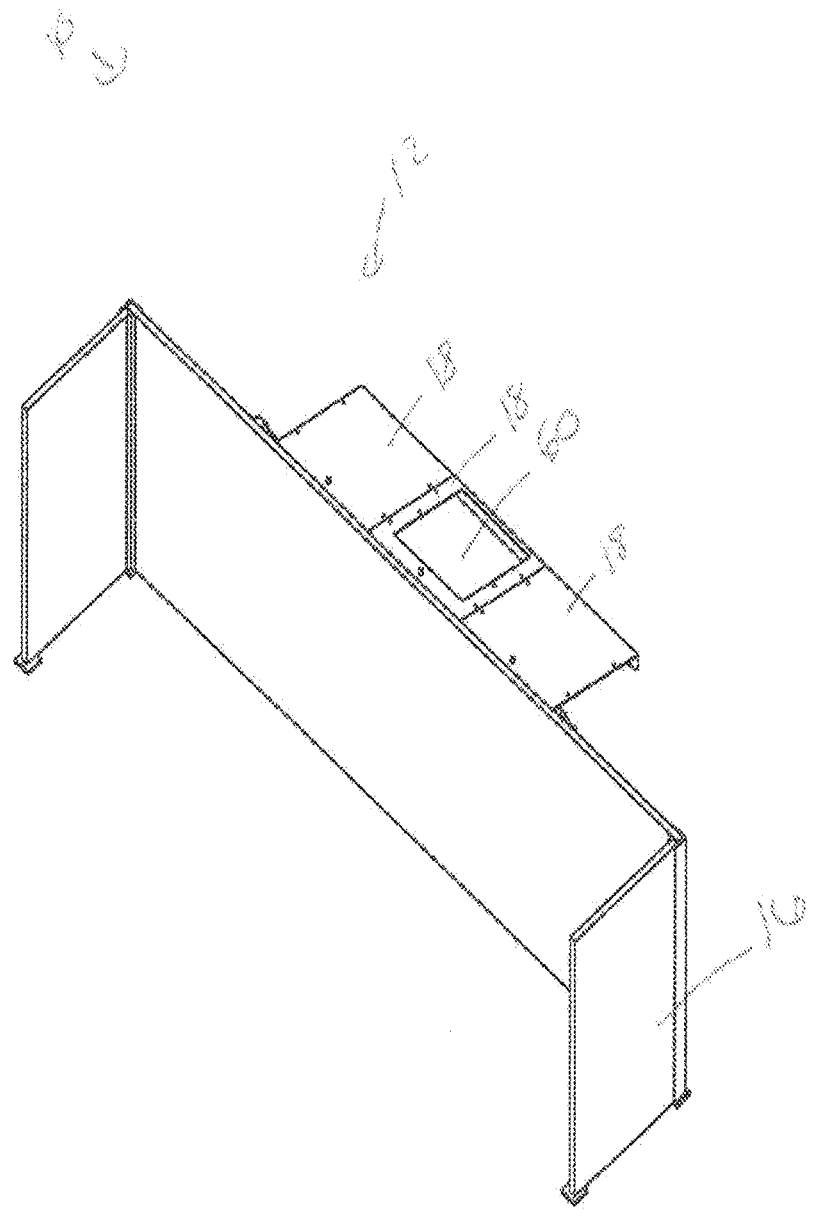
FIG. 12 shows an upper rear right perspective view of an animal warming device, in accordance with one or more arrangements.
Figure 13:
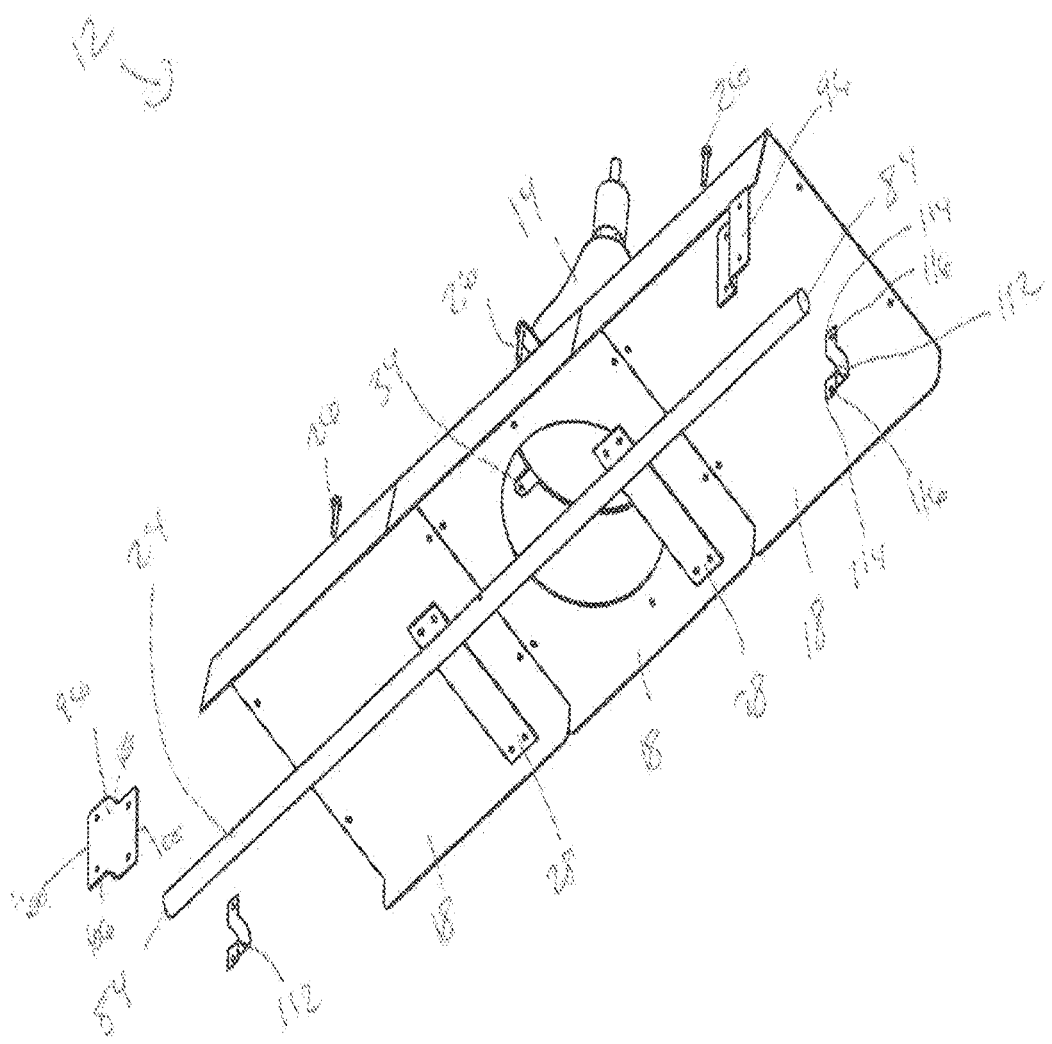
FIG. 13 shows a lower rear right perspective view of a platform assembly of an animal warming device, in accordance with one or more arrangements.
Figure 14:
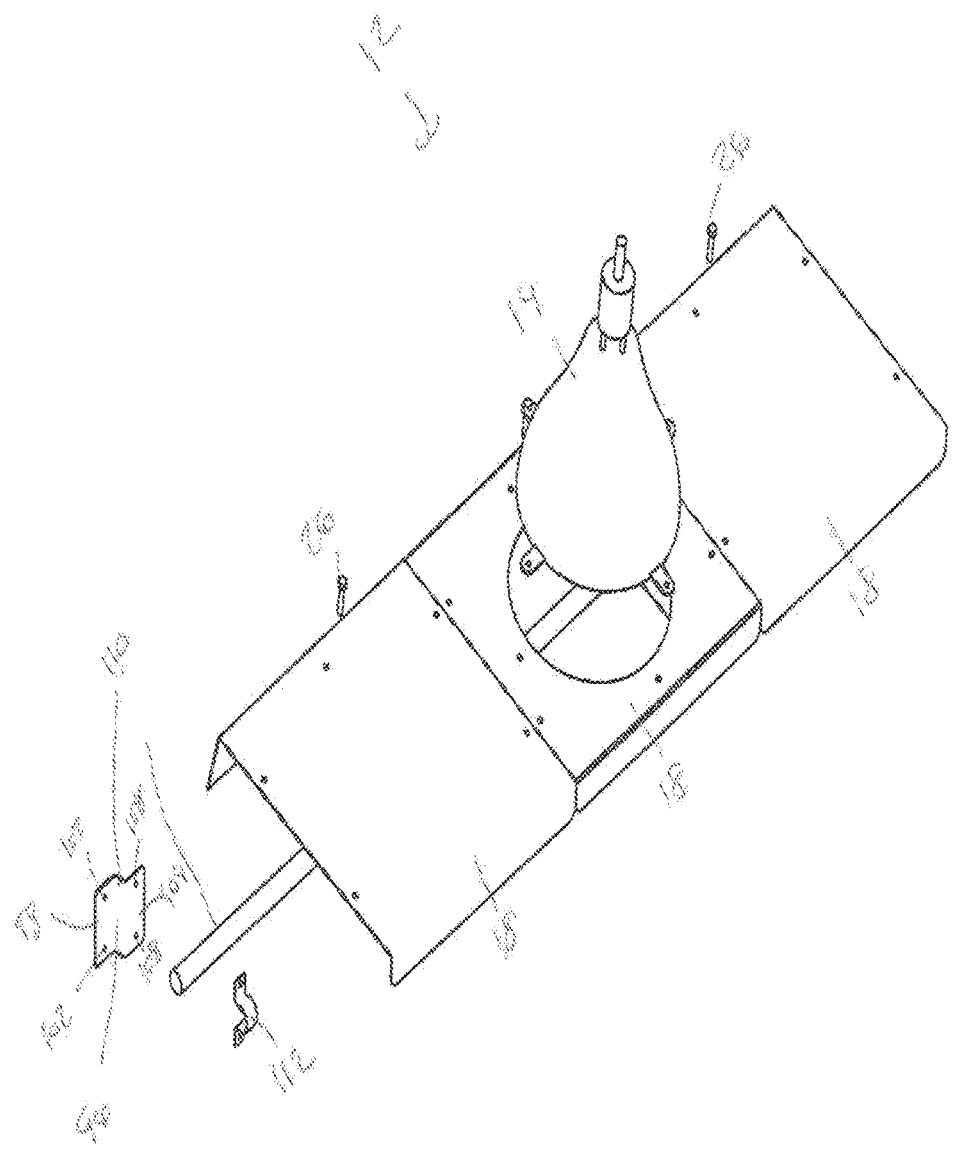
FIG. 14 shows an upper front right perspective view of a platform assembly of an animal warming device, in accordance with one or more arrangements.
Figure 15:
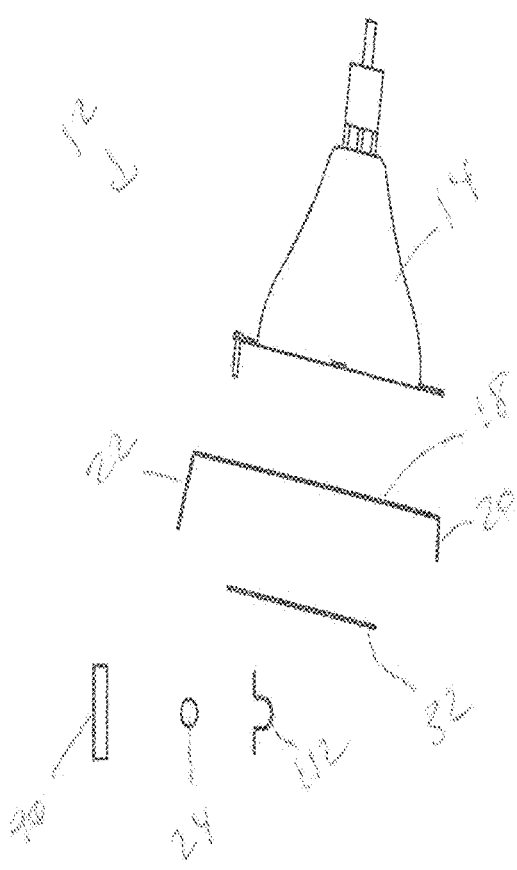
FIG. 15 shows a rear side exploded view of a platform assembly of an animal warming device, in accordance with one or more arrangements.
Figure 16:
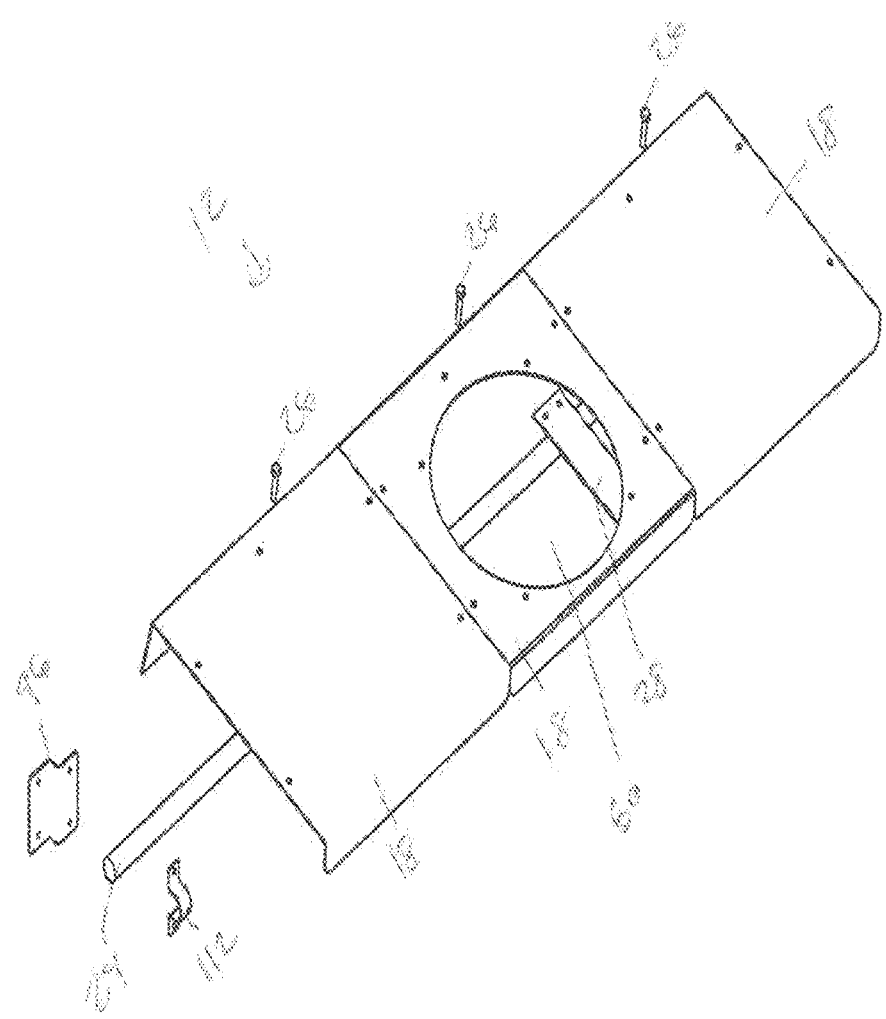
FIG. 16 shows an upper front right perspective view of a platform assembly of an animal warming device, in accordance with one or more arrangements.
Figure 17:
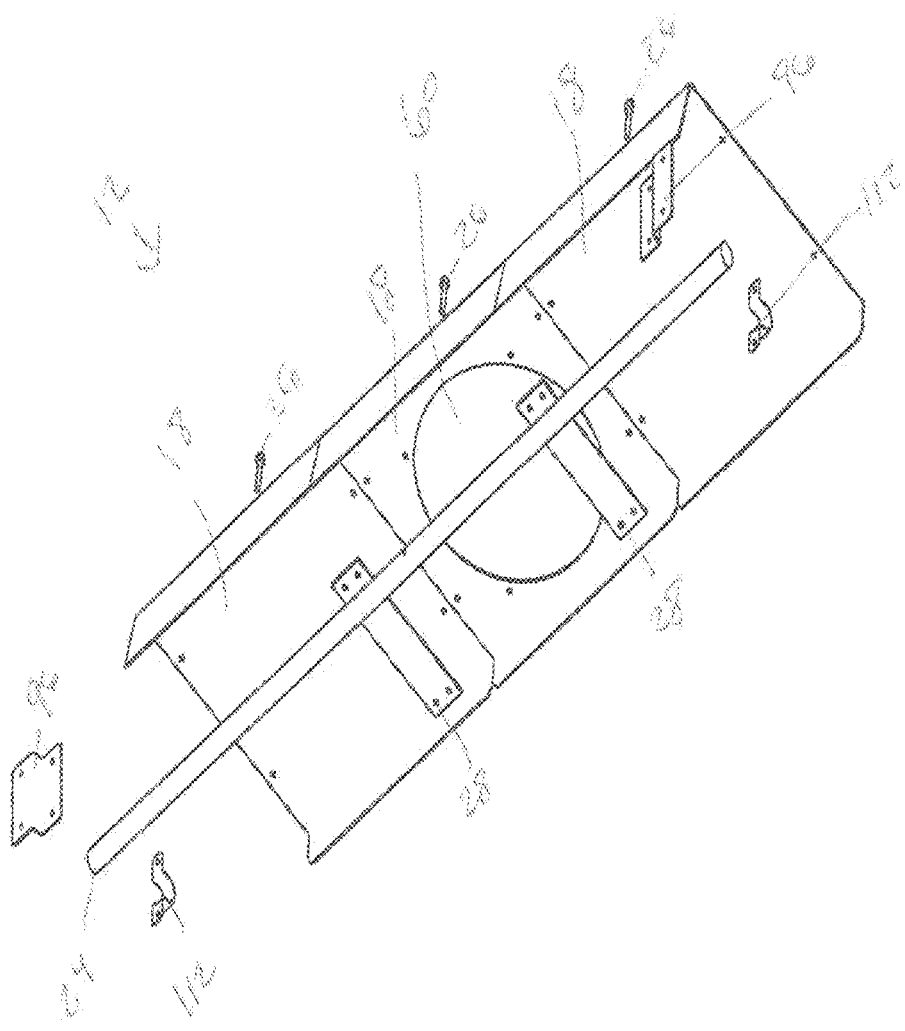
FIG. 17 shows a lower rear right perspective view of a platform assembly of an animal warming device, in accordance with one or more arrangements.
Figure 18:
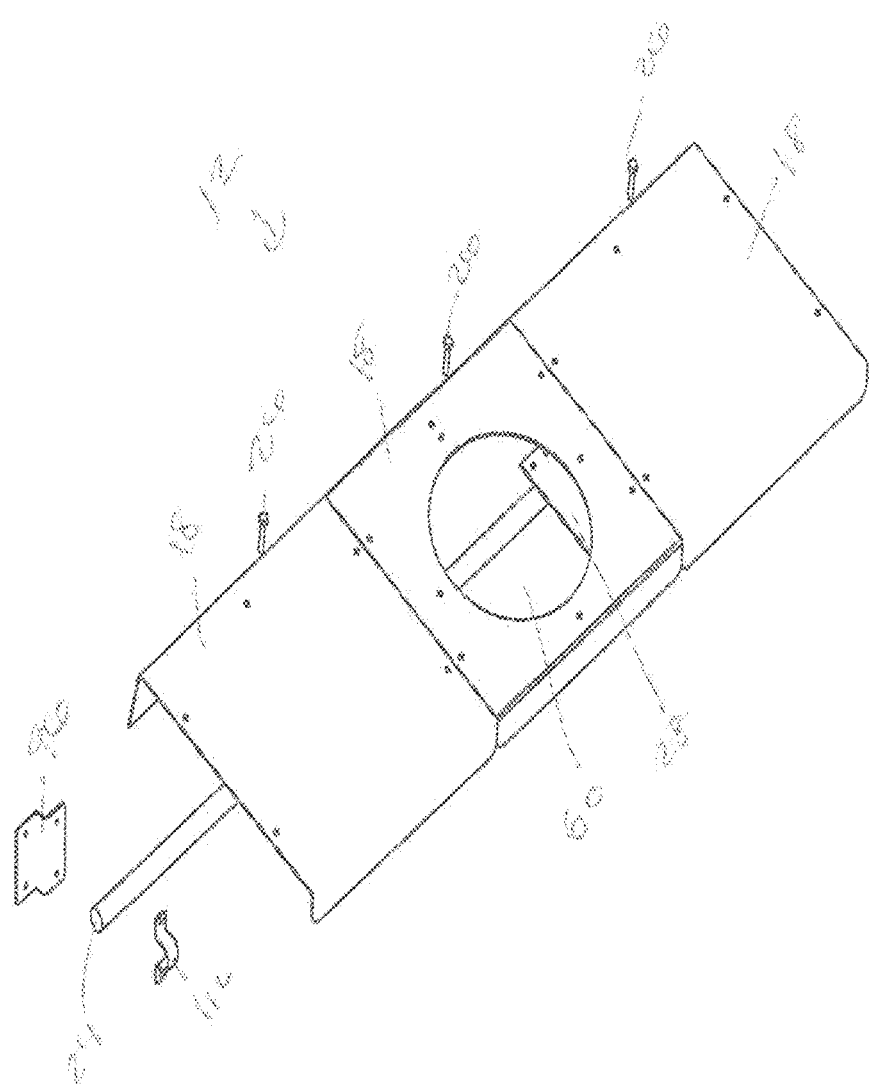
FIG. 18 shows an upper front right perspective view of a platform assembly of an animal warming device, in accordance with one or more arrangements.
Figure 19:
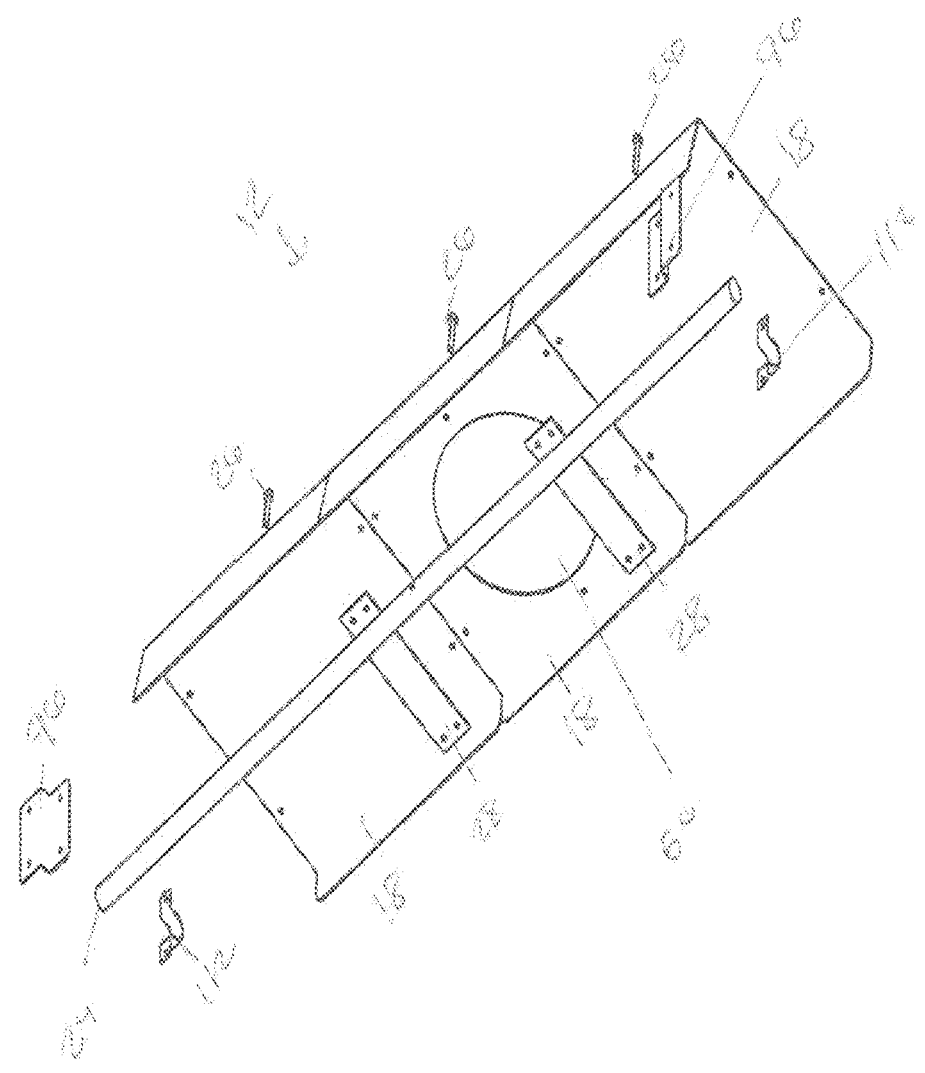
FIG. 19 shows a lower rear right perspective view of a platform assembly of an animal warming device, in accordance with one or more arrangements.
Figure 20:
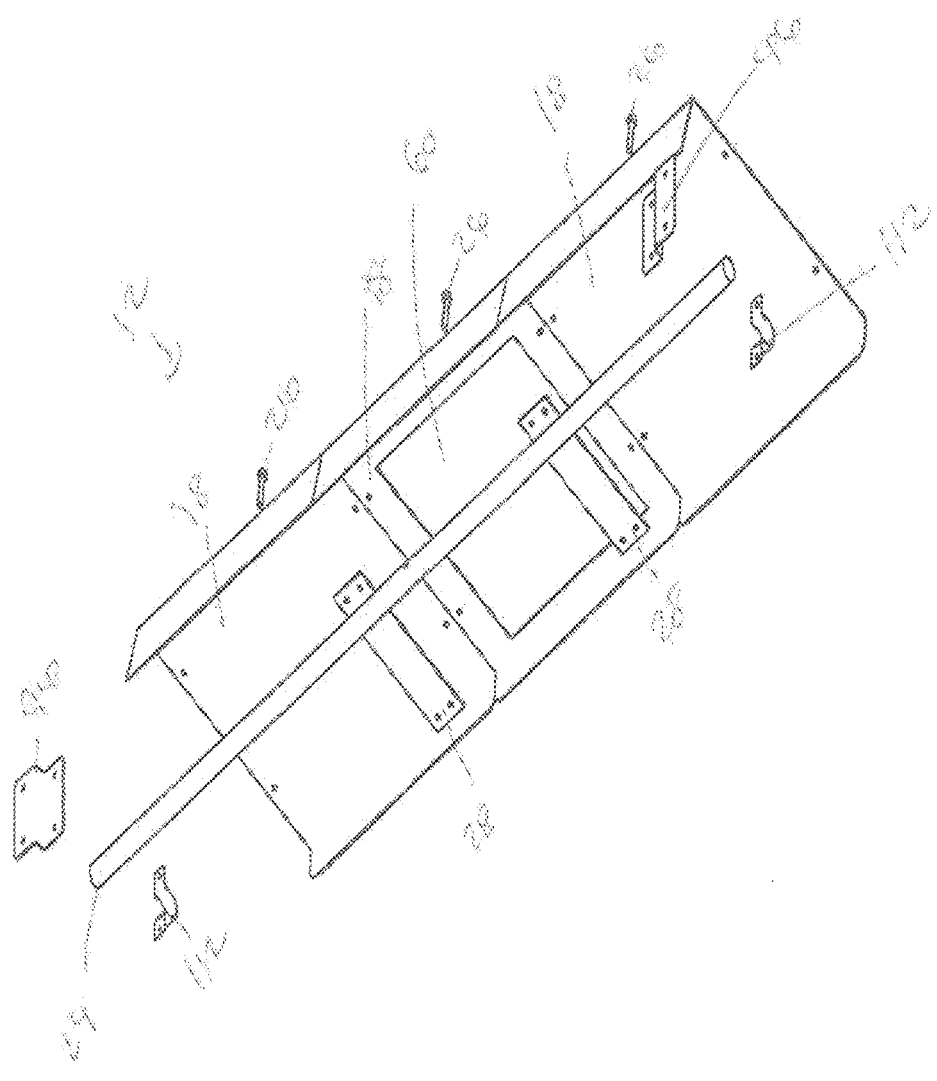
FIG. 20 shows a lower rear right perspective view of a platform assembly of an animal warming device, in accordance with one or more arrangements.
Figure 21:
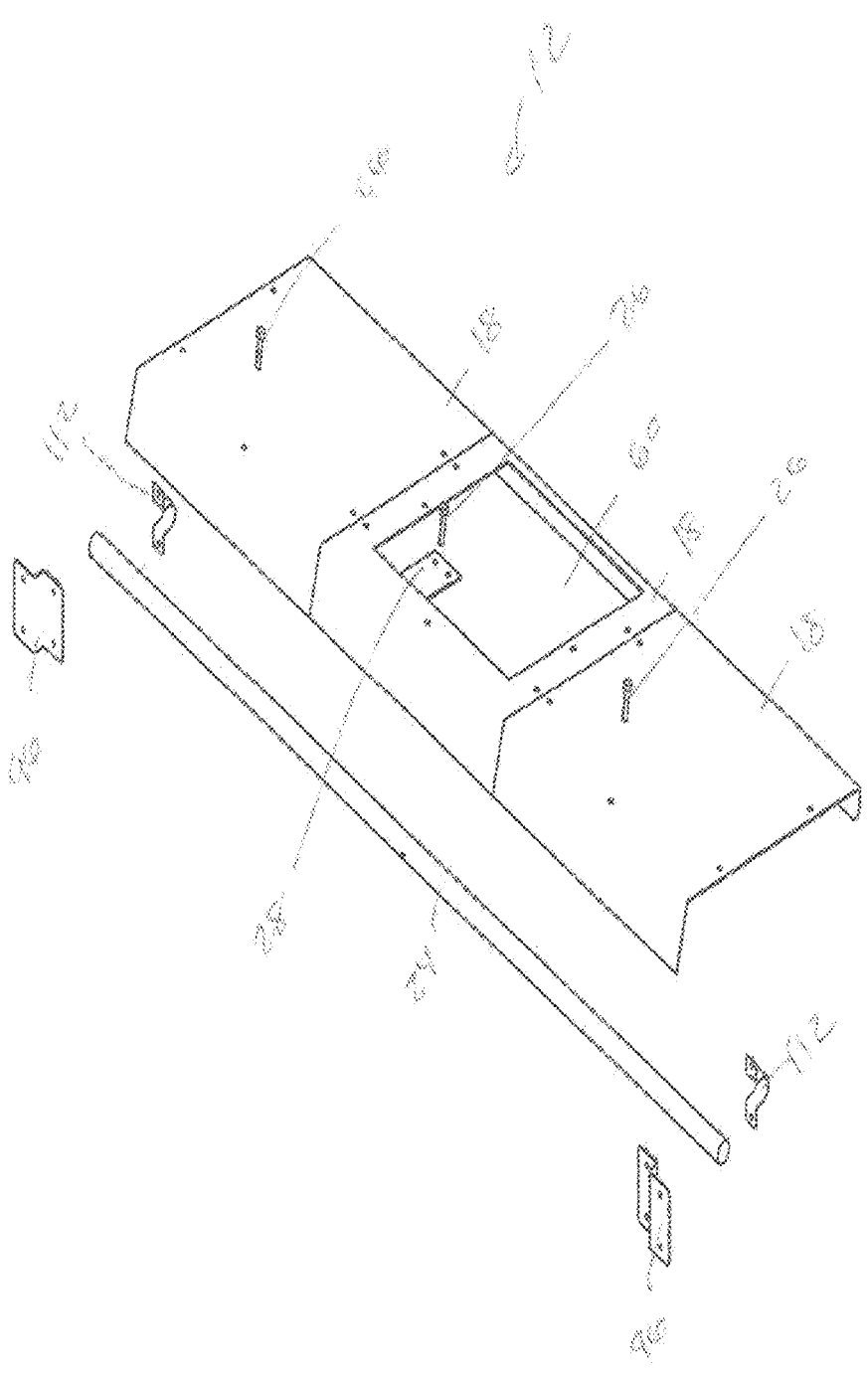
FIG. 21 shows an upper rear right perspective view of a platform assembly of an animal warming device, in accordance with one or more arrangements.
Figure 22:
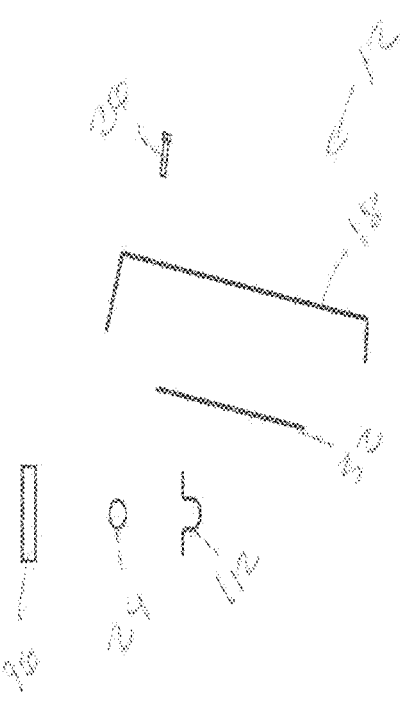
FIG. 22 shows a right side exploded view of a platform assembly of an animal warming device, in accordance with one or more arrangements.
Figure 23:
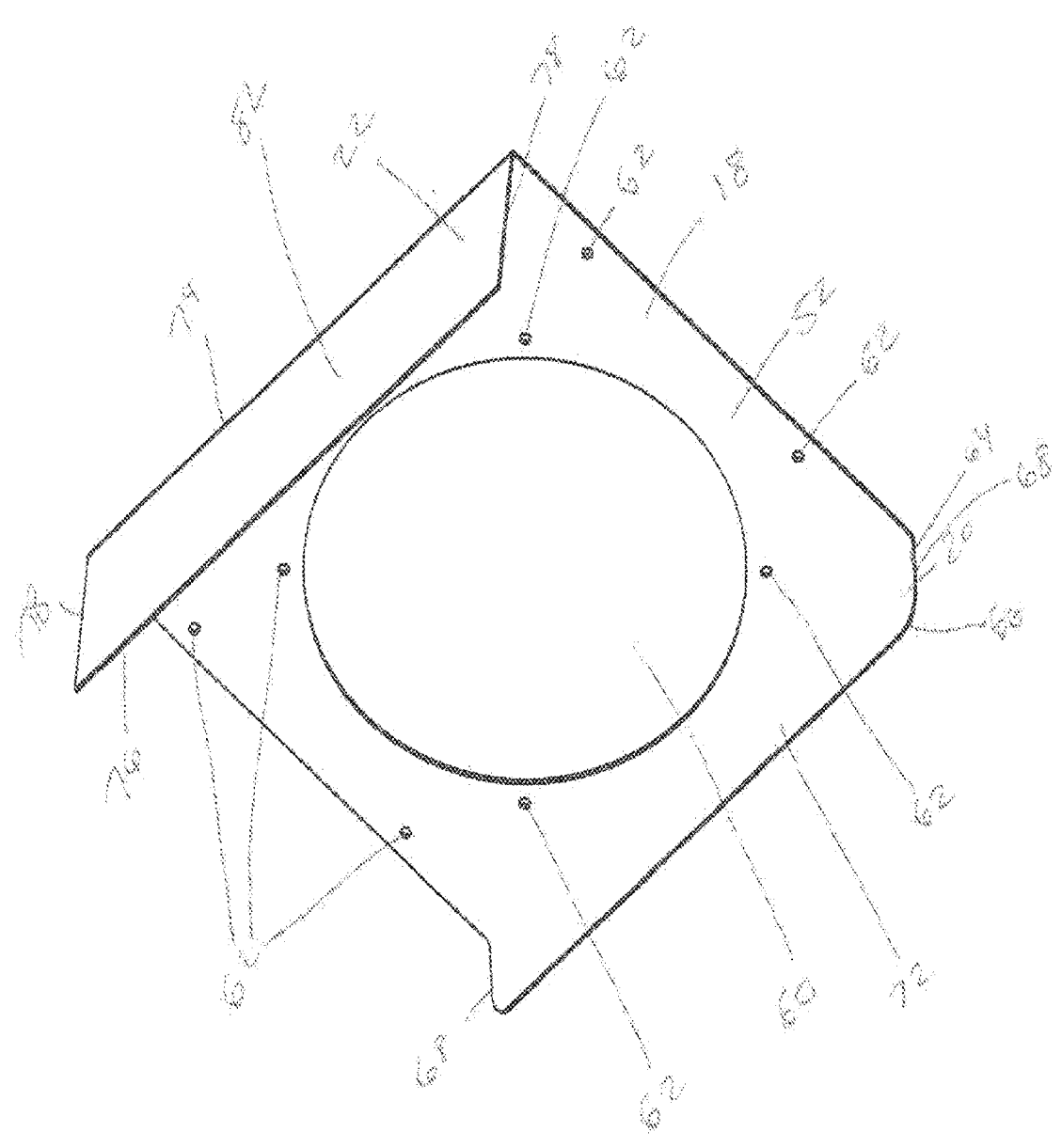
FIG. 23 shows a lower rear right perspective view of a panel of a platform assembly of an animal warming device, in accordance with one or more arrangements.
Figure 24:
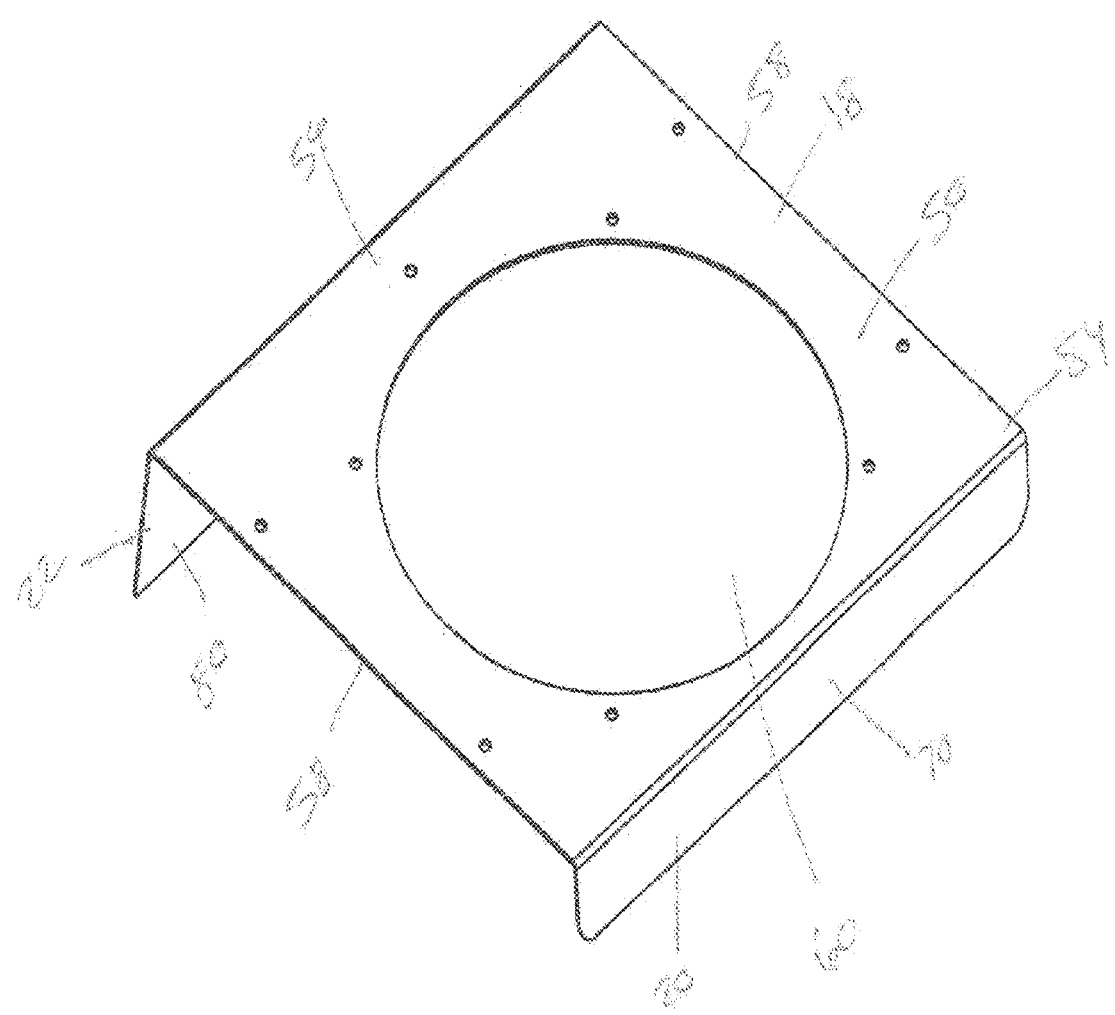
FIG. 24 shows an upper front right perspective view of a panel of a platform assembly of an animal warming device, in accordance with one or more arrangements.
Figure 25:
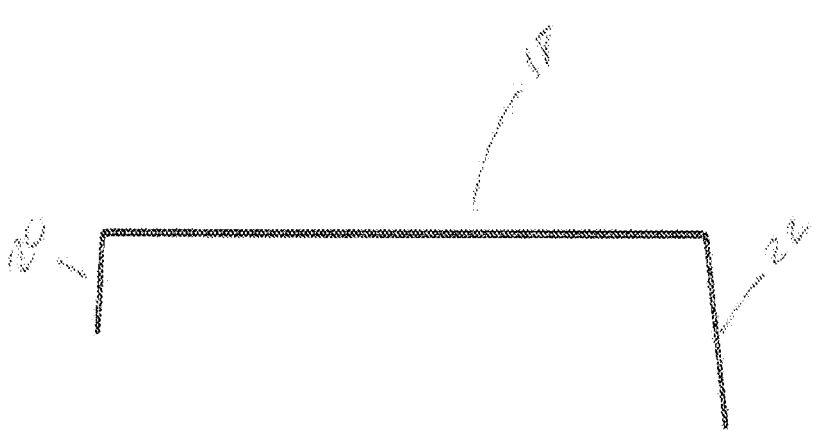
FIG. 25 shows a left side view of a panel of a platform assembly of an animal warming device, in accordance with one or more arrangements.
Figure 26:
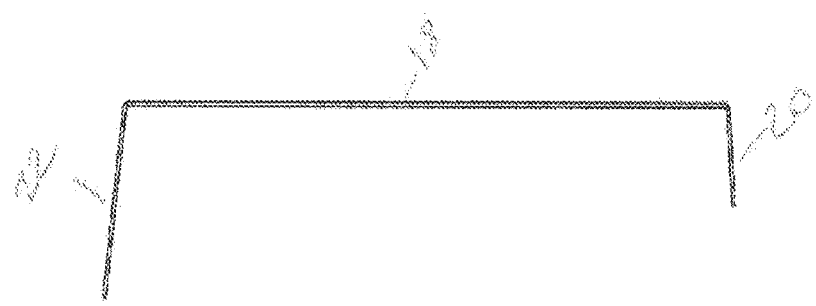
FIG. 26 shows a right side view of a panel of a platform assembly of an animal warming device, in accordance with one or more arrangements.
Figure 27:
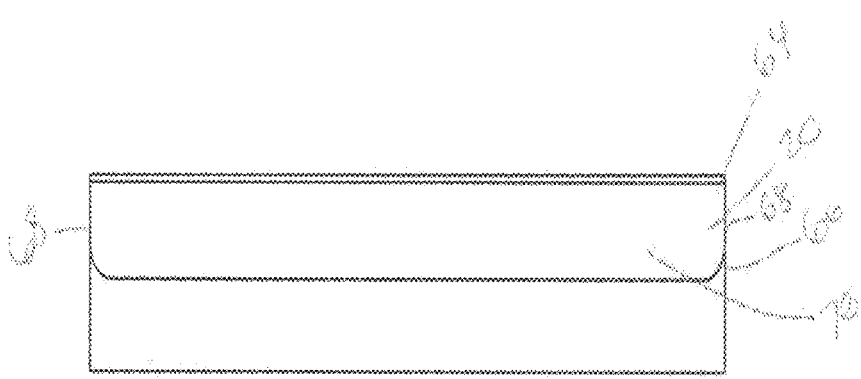
FIG. 27 shows a front view of a panel of a platform assembly of an animal warming device, in accordance with one or more arrangements.
Figure 28:
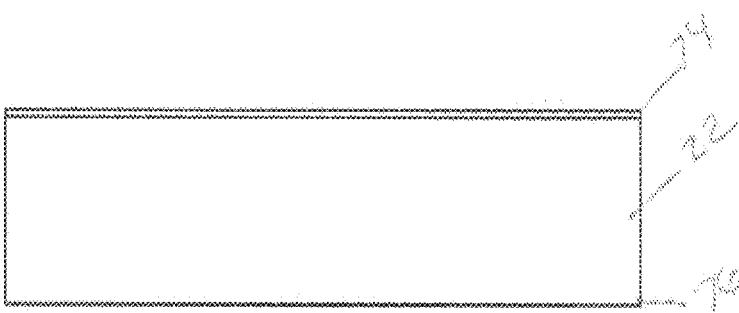
FIG. 28 shows a rear view of a panel of a platform assembly of an animal warming device, in accordance with one or more arrangements.
Figure 29:
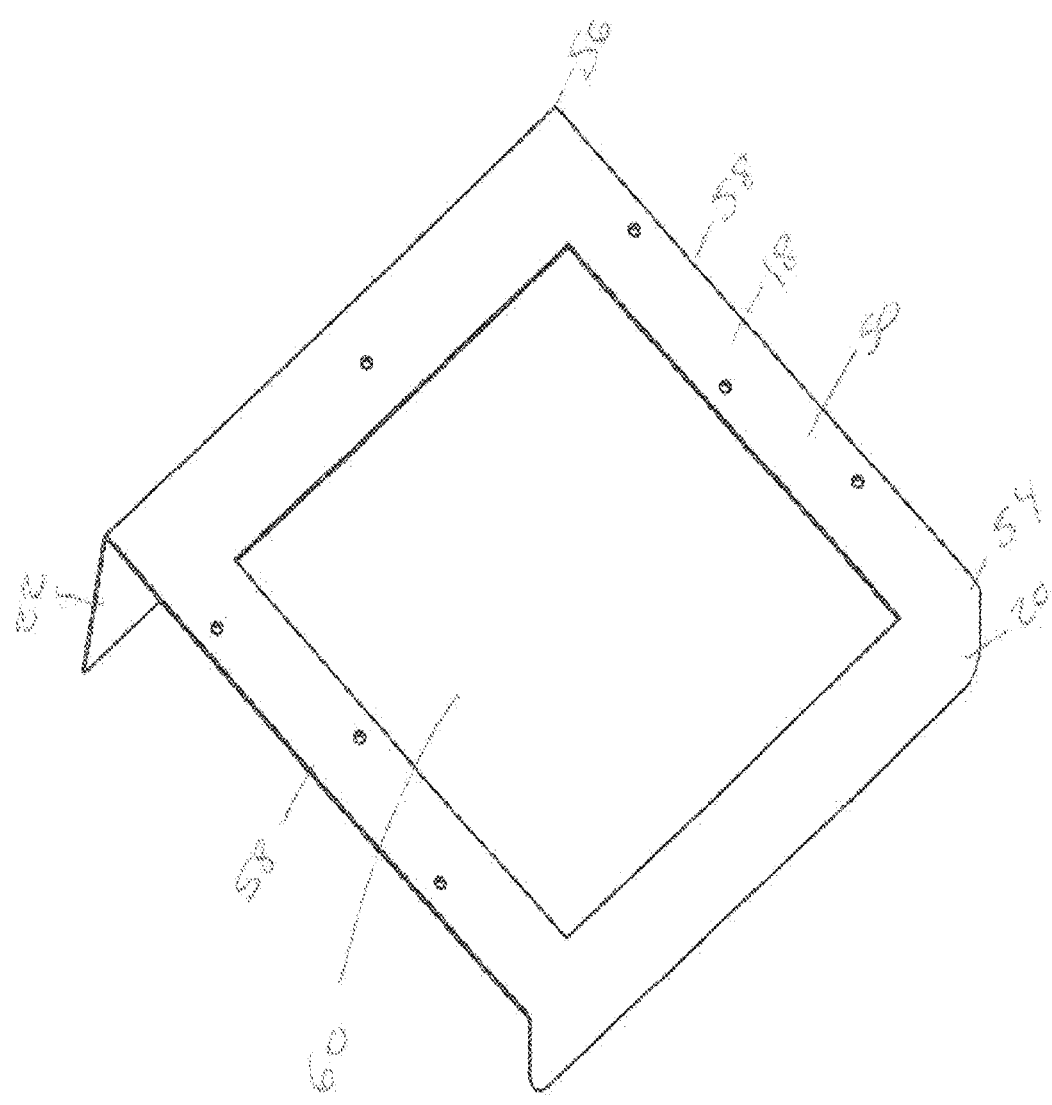
FIG. 29 shows an upper front right perspective view of a panel of a platform assembly of an animal warming device, in accordance with one or more arrangements.
Figure 30:
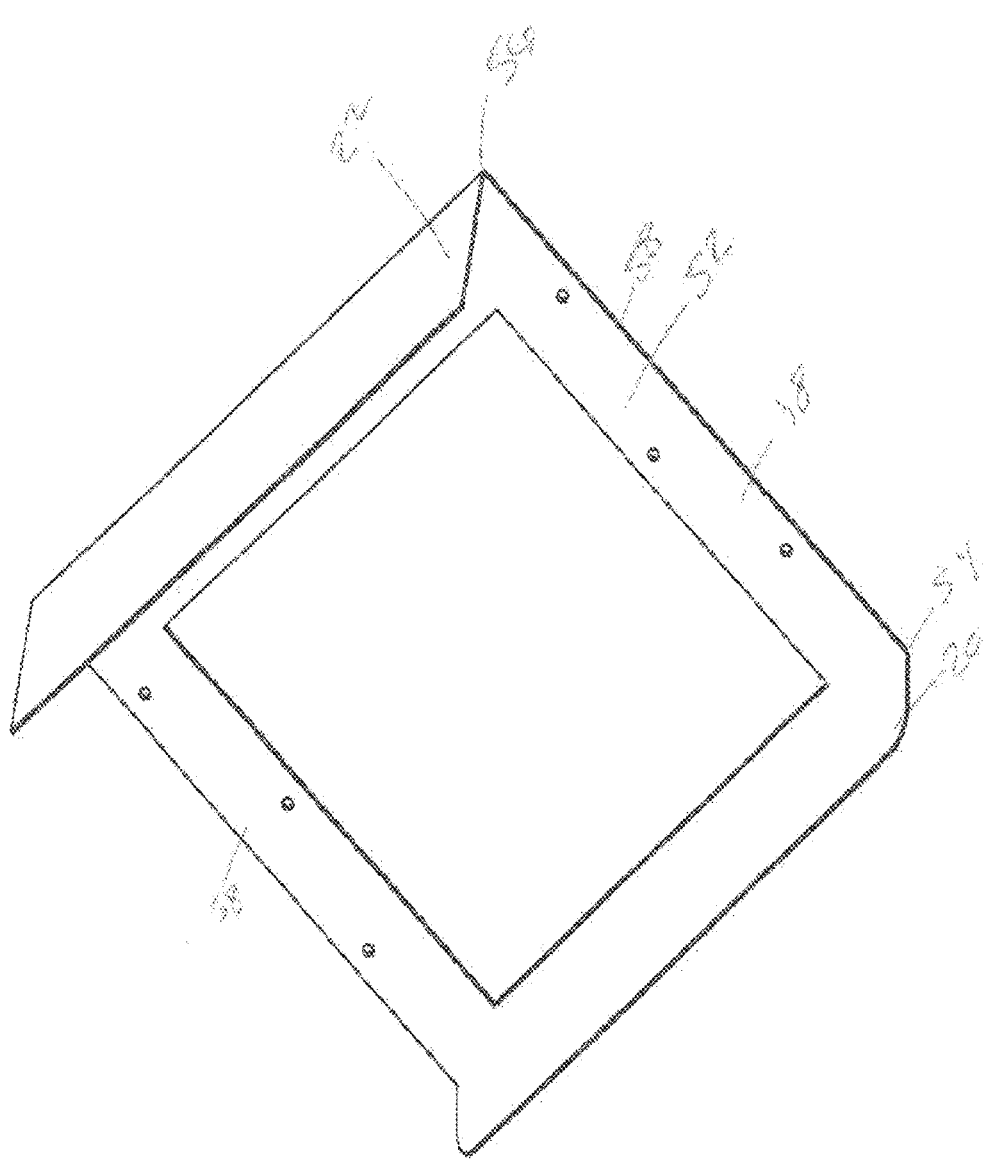
FIG. 30 shows a lower rear right perspective view of a panel of a platform assembly of an animal warming device, in accordance with one or more arrangements.
Figure 31:
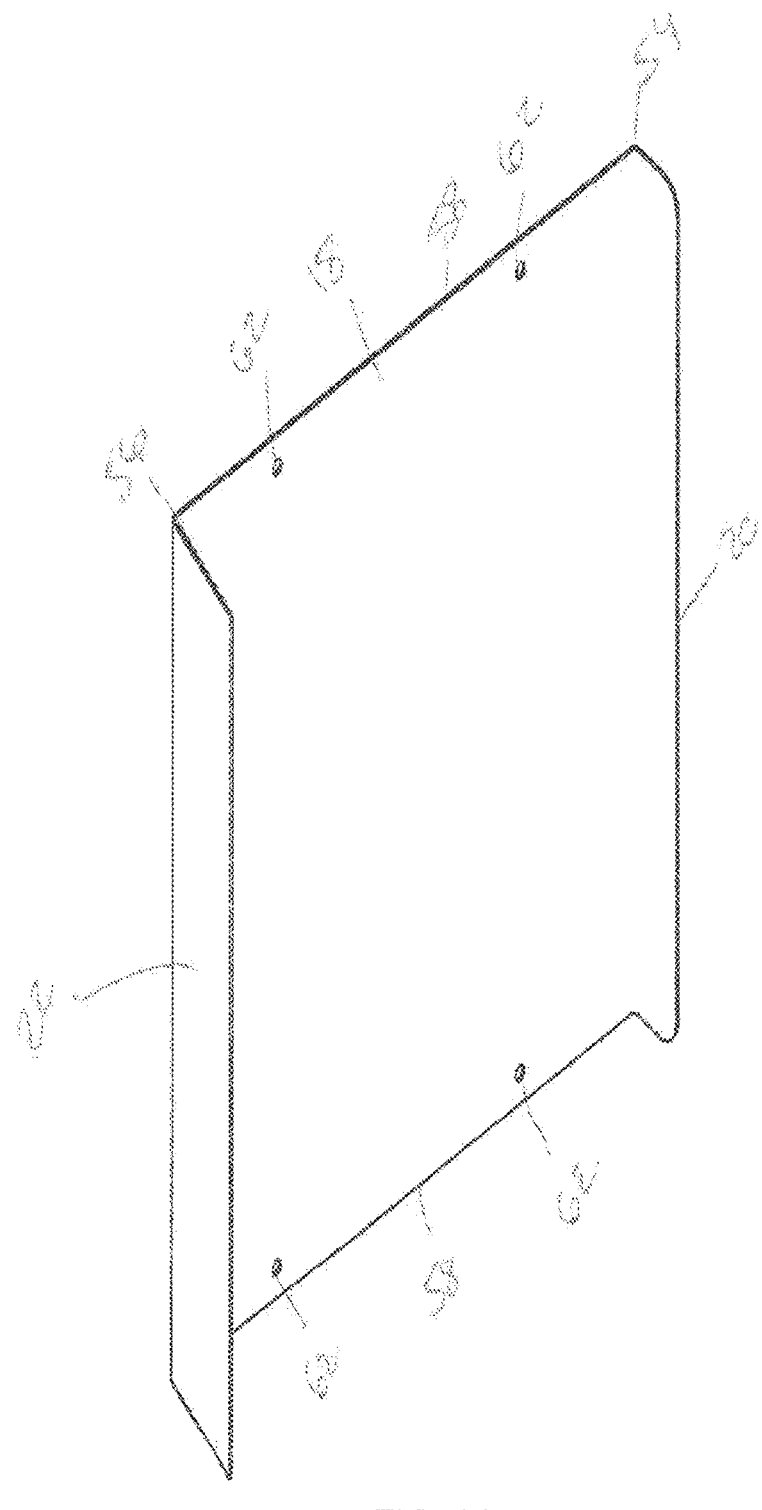
FIG. 31 shows a lower rear right perspective view of a panel of a platform assembly of an animal warming device, in accordance with one or more arrangements.
Figure 32:
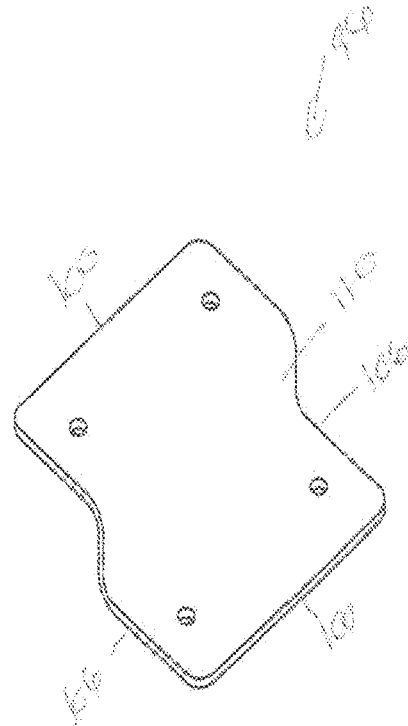
FIG. 32 shows a perspective view of an example bracket for connecting components of a platform assembly of an animal warming device to a barrier of an animal housing facility, in accordance with one or more arrangements.
Figure 33:
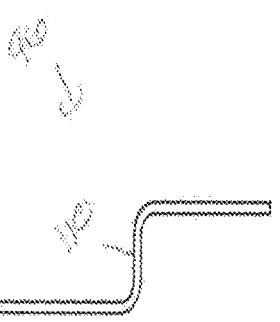
FIG. 33 shows a side view of an example bracket for connecting components of a platform assembly of an animal warming device to a barrier of an animal housing facility, in accordance with one or more arrangements.
Figure 34A:
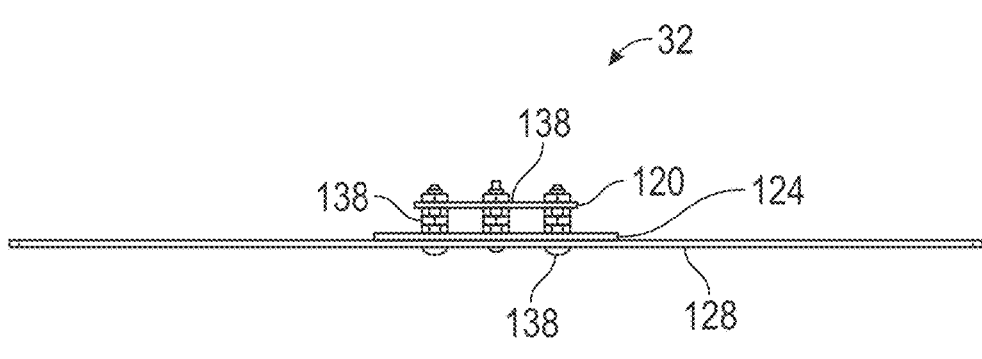
FIG. 34A shows a front view of an example diffuser assembly for a platform assembly of an animal warming device to a barrier of an animal housing facility, in accordance with one or more arrangements.
Figure 34B:
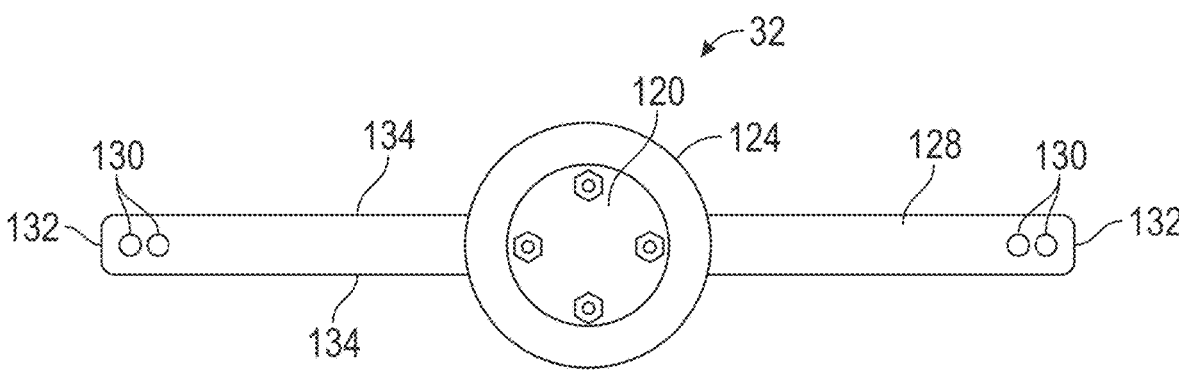
FIG. 34B shows a top view of an example diffuser assembly for a platform assembly of an animal warming device to a barrier of an animal housing facility, in accordance with one or more arrangements.
Figure 34C:
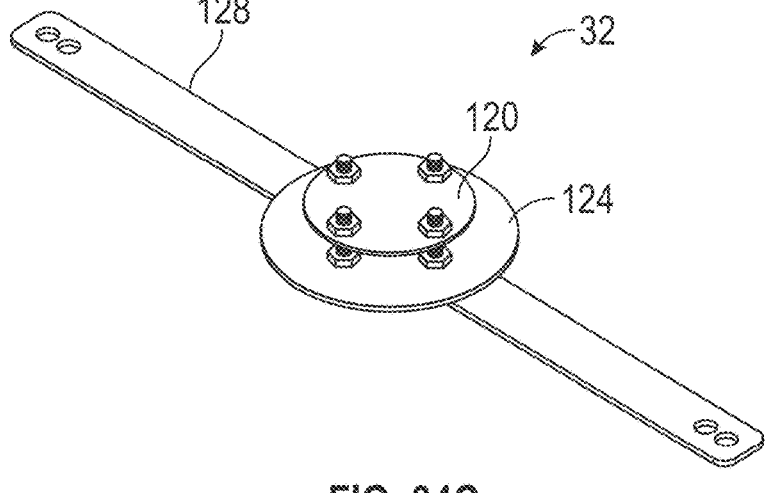
Figure 36A:
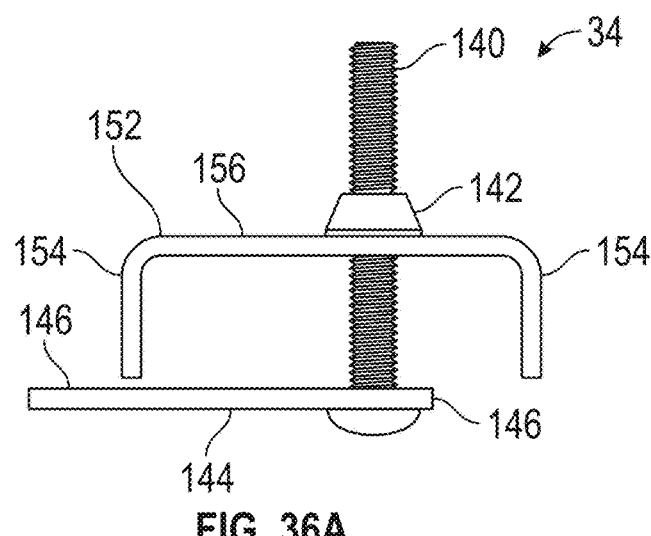

FIG. 36A shows a front view of an example clip assembly for a platform assembly of an animal warming device to a barrier of an animal housing facility, in accordance with one or more arrangements.

Figure 36B:
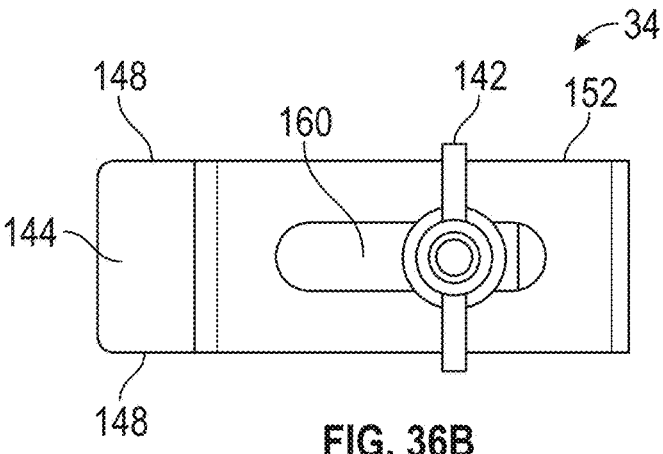

FIG. 36B shows a top view of an example clip assembly for a platform assembly of an animal warming device to a barrier of an animal housing facility, in accordance with one or more arrangements.

Figure 36C:
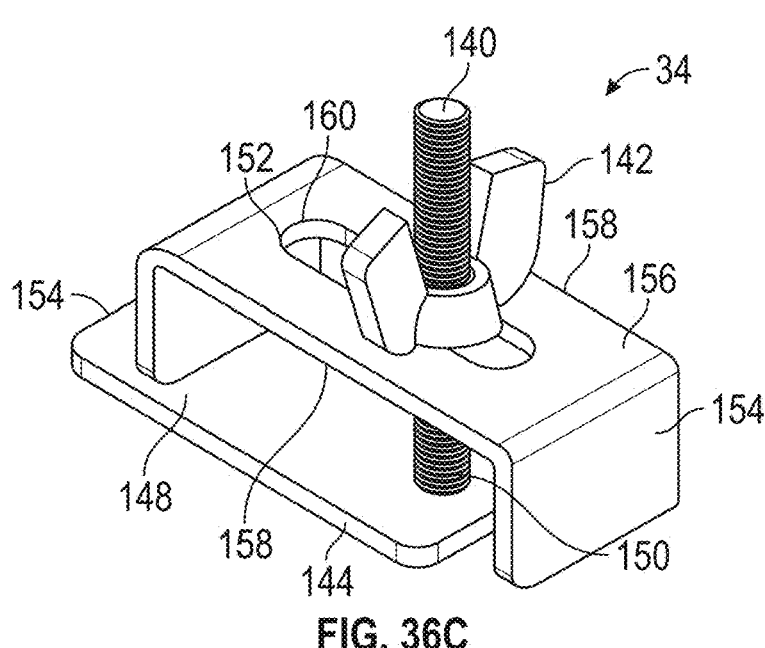

FIG. 36C shows an upper side from perspective view of an example clip assembly for a platform assembly of an animal warming device to a barrier of an animal housing facility, in accordance with one or more arrangements.

Figure 37A:
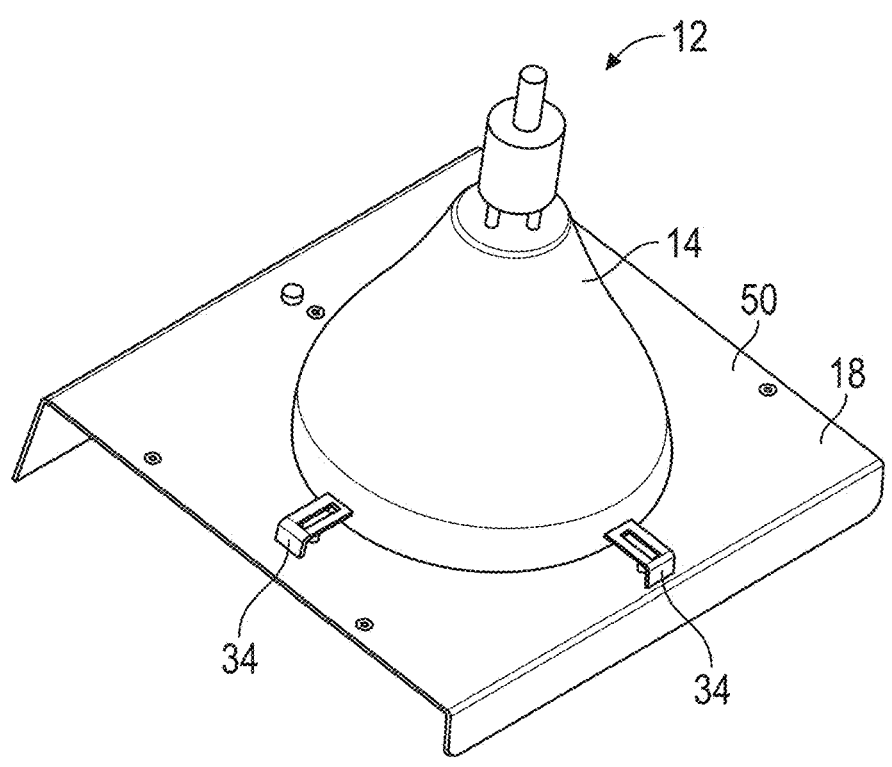

FIG. 37A shows an upper front right perspective view of a platform assembly of an animal warming device, in accordance with one or more arrangements.

Figure 37B:
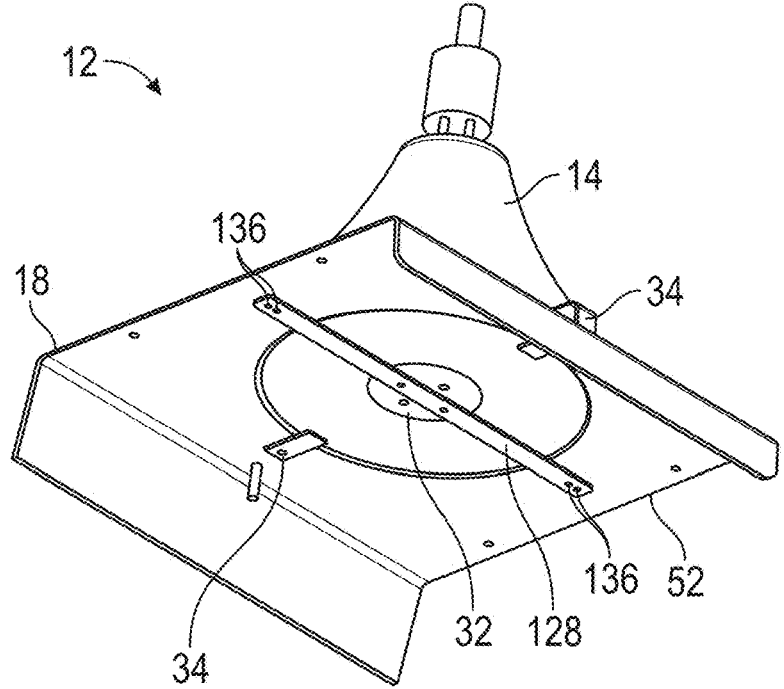

FIG. 37B shows a lower front right perspective view of a platform assembly of an animal warming device, in accordance with one or more arrangements.

Figure 38A:
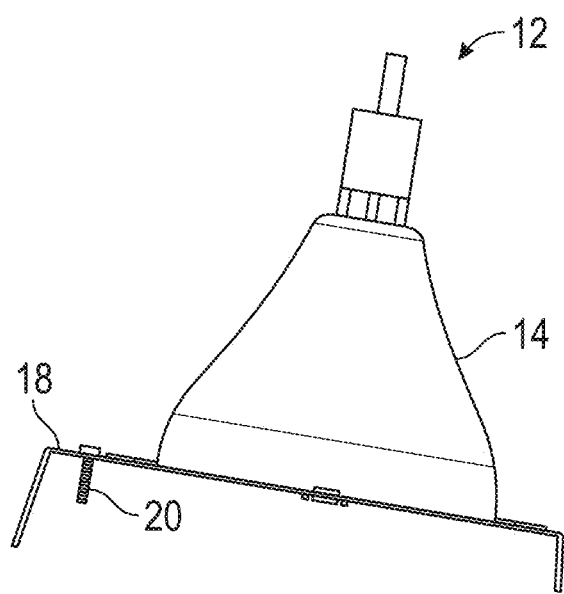

FIG. 38A shows a right side view of a platform assembly of an animal warming device, in accordance with one or more arrangements.

Figure 38B:
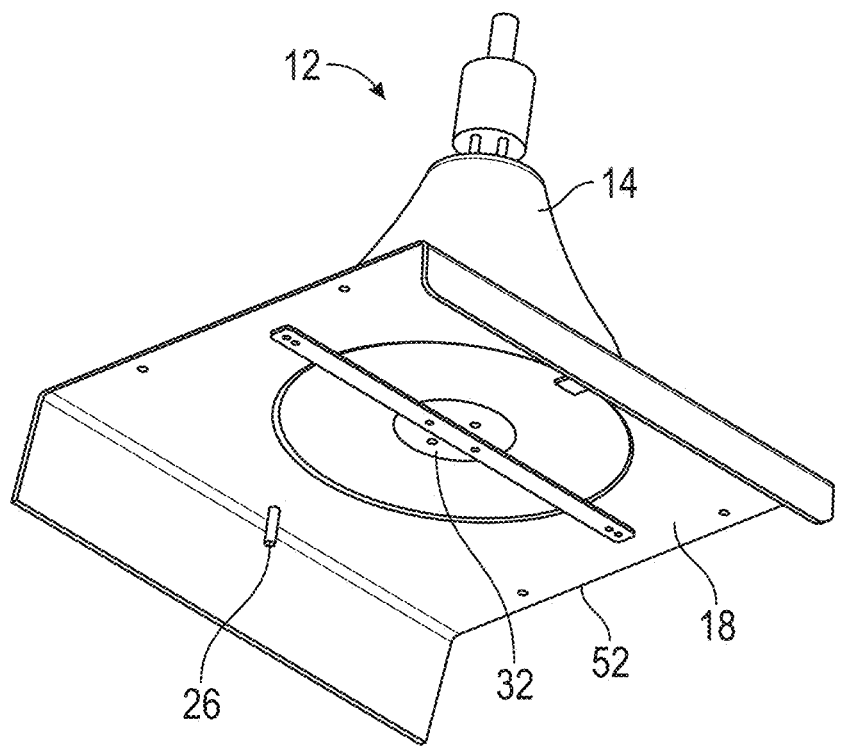

FIG. 38B shows a bottom view of a platform assembly of an animal warming device, in accordance with one or more arrangements.

Figure 38C:
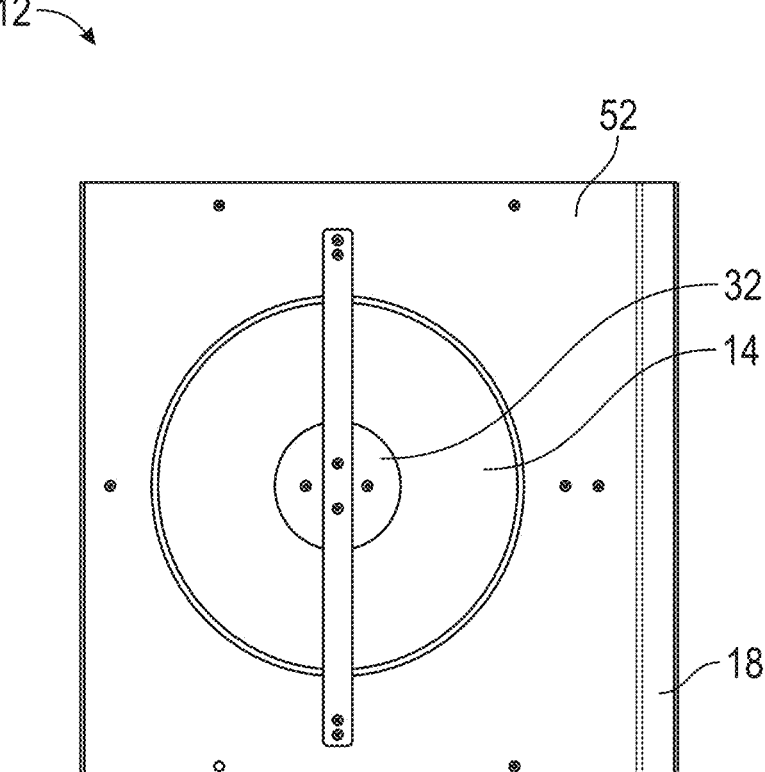

FIG. 38C shows a lower front right perspective view of a platform assembly of an animal warming device, in accordance with one or more arrangements.

Figure 39:
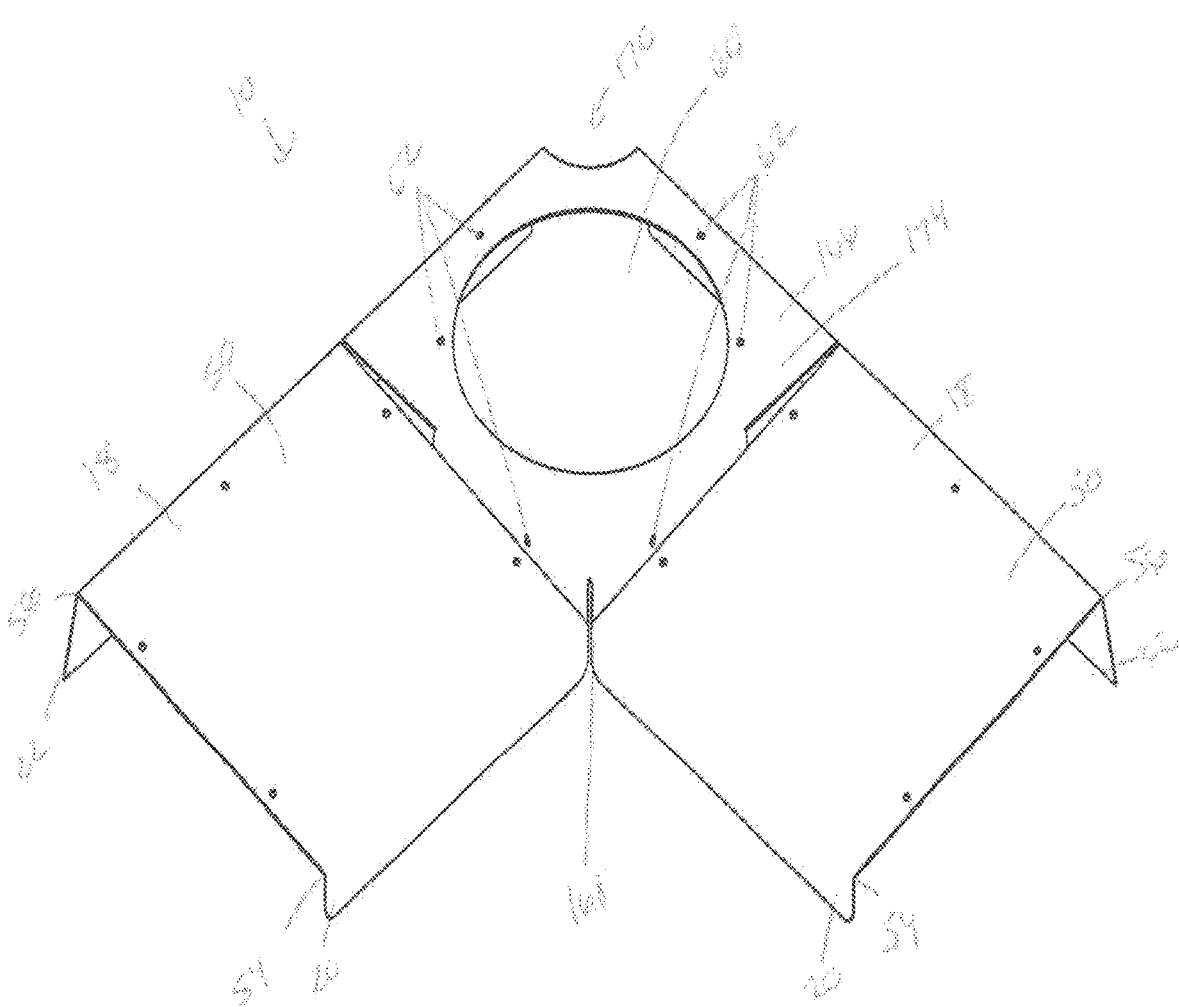

FIG. 39 shows an upper front perspective view of a platform assembly of an animal warming device, in accordance with one or more arrangements.

Figure 40:
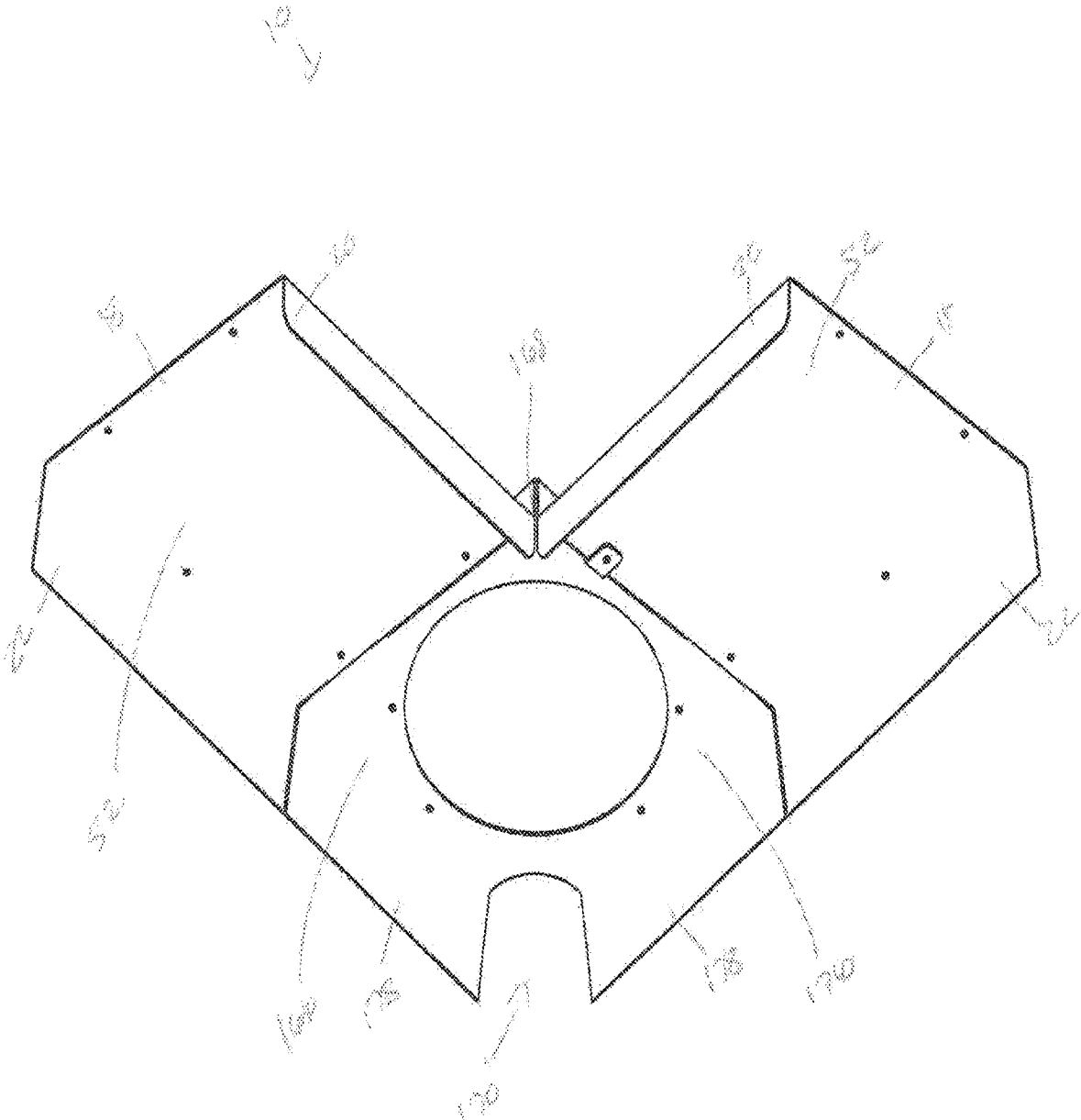

FIG. 40 shows a lower front perspective view of a platform assembly of an animal warming device, in accordance with one or more arrangements.

Figure 41:
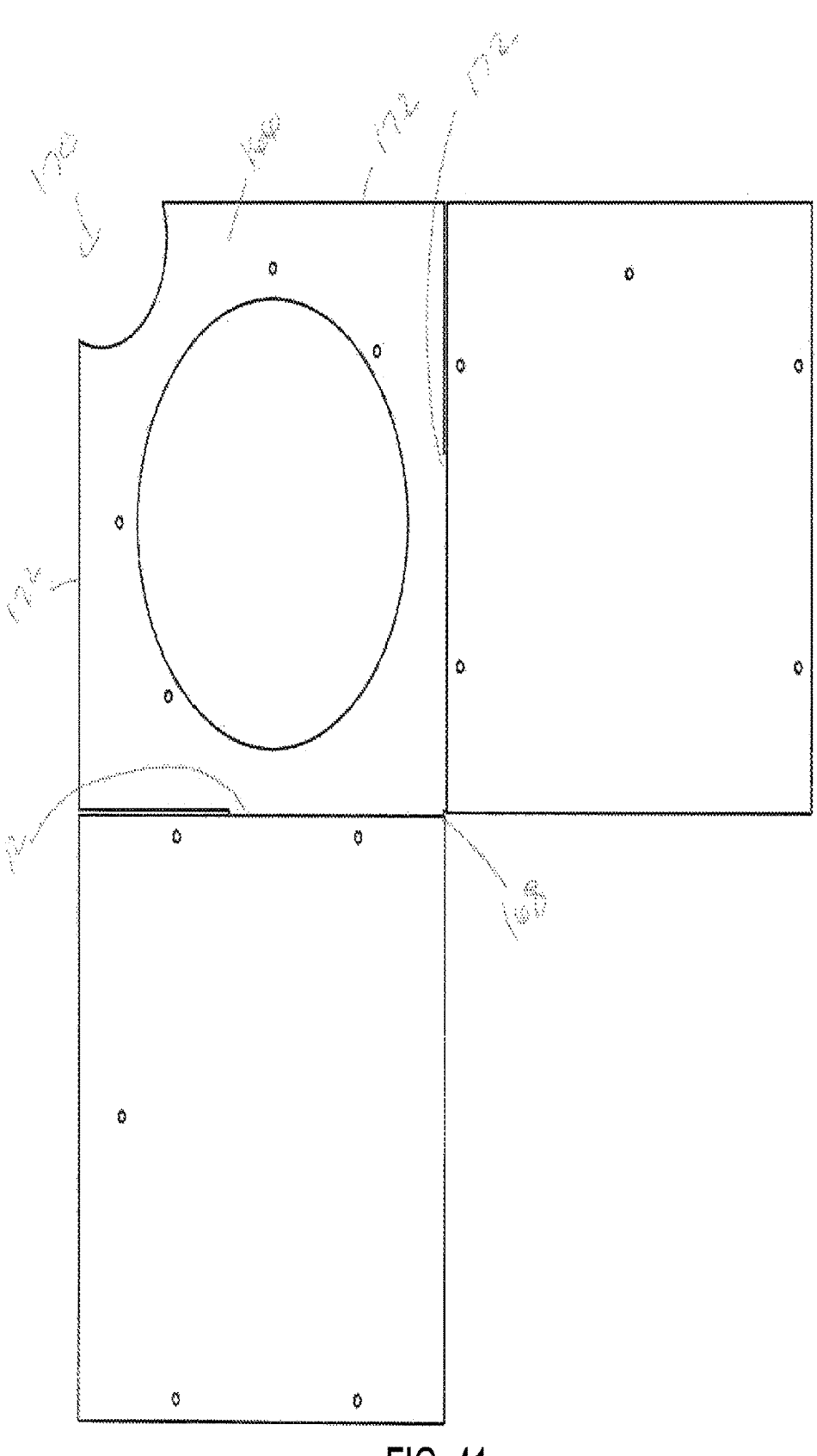

FIG. 41 shows a top view of a platform assembly of an animal warming device, in accordance with one or more arrangements.

Figure 42:
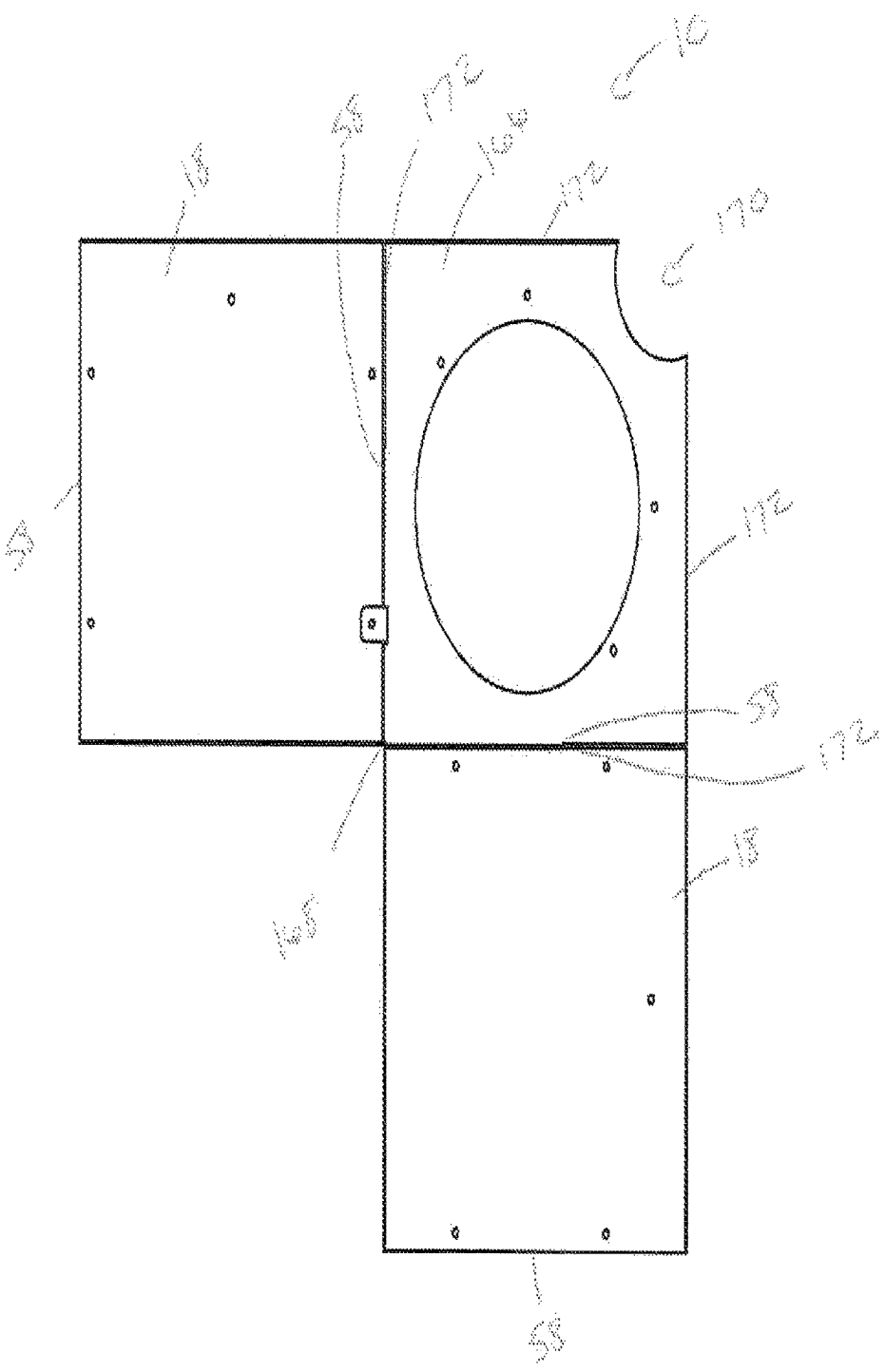

FIG. 42 shows a bottom view of a platform assembly of an animal warming device, in accordance with one or more arrangements.

DETAILED DESCRIPTION

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, side, height, length, width, upper, lower, interior, exterior, inner, outer, and the like as may be used herein, merely describe points of reference and do not limit the present invention to any particular orientation or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described as comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected, or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually, or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of heating systems. However, the embodiments are not so limited. It is appreciated that the embodiments may be adapted for use in other applications which may be improved by the disclosed structures, arrangements and/or methods. The system is merely shown and described as being used in in the context of heating systems for ease of description and as one of countless examples.

Device 10:

In various embodiments, an animal warming device 10 (or simply device 10) may be formed of any suitable size, shape, and design and is configured to provide a system for organizing heating elements to warm animals. In the arrangement shown, as one example, device 10 includes a platform assembly 12, a heating element 14, and a barrier 16, among other components.

Platform Assembly 12:

Platform assembly 12 is formed of any suitable size, shape, and design and is configured to hold various components of device 10. In the arrangement shown, as one example, platform assembly 12 extends from a front side 36 to a rear side 38, from a top side 44 to a bottom side 48, and from a left side 40 to a right side 42. In this example arrangement, platform assembly 12 includes one or more plates 18, one or more front lips 20, one or more rear lips 22, a support member 24, stop members 26, one or more braces 28, a bracket assembly 30, a diffuser assembly 32, and a clip assembly 34. However, the embodiments are not so limited. In the arrangement shown, as one example, platform assembly 12 can be altered by an operator to correspond to various sizes of animal housing facilities. Further, in this example arrangement, platform assembly 12 may rotate between a deployed position 162 and a raised position 164. However, any other suitable size, shape and design is hereby contemplated for use.

In this example arrangement, the components of platform assembly 12 are formed of any suitable size, shape, and design. In the arrangement shown, as one example, platform assembly 12 is comprised of metal materials. However, it is contemplated that the components of platform assembly 12 may be constructed of any type of material including, but not limited to wood, plastic, metals, and/or composite materials so long as the materials used can withstand the cleaning and disinfectant procedures used in an animal housing facility, as well as being heat resistant, where necessary and generally being strong enough and durable enough for long term use. However, any other suitable size, shape and design is hereby contemplated for use.

Plate 18:

Plate 18 is formed of any suitable size, shape, and design and is configured to provide support for a heating element 14. In the arrangement shown, as one example, platform assembly 12 includes one or more plates 18 having a generally planar rectangular shape which extends from a front edge 54 to a rear edge 56 and extends between opposing side edges 58. In this example arrangement, one or more plates 18 also include a top 50 and a bottom 52. In this example arrangement, one or more plates 18 include an opening 60 and connection openings 62 that extend through the top 50 of plate 18 to the bottom 52 of plate 18. In this example arrangement, the opening 60 of the one or more plates 18 is positioned in the center section of plate 18 and is configured to correspond to various sizes and shapes of heating elements 14 of device 10, including but not limited to, a circle, a square, a rectangle, or a triangle. In this example arrangement, the opening 60 is configured to allow heat from a heating element 14 to warm animals in an animal housing facility. In this example arrangement, platform assembly 12 includes a first plate 18 which includes an opening 60 to allow heat to pass through the plate 18. However, the embodiments are not so limited. In this example arrangement, platform assembly 12 includes a second plate 18 and a third plate 18 positioned on either side of the first plate 18 having an opening 60. In this example arrangement, platform assembly 12 may be comprised of any number of plates 18 depending on the configuration desired by an operator. In this example arrangement, each plate 18 may be placed next to another plate 18 so that the opposing side edges 58 of each plate 18 are parallel to one another. Additionally, in this example arrangement, each plate 18 of platform assembly 12 may support one or more heating elements 14 positioned on the top 50 of plate 18 and corresponding to the size and shape of opening 60, depending on an operator's preference. However, any other suitable size, shape, and design is hereby contemplated for use.

Front Lip 20:

Front lip 20 is formed of any suitable size, shape, and design and is positioned to support platform assembly 12 to provide heat to animals. In the arrangement shown, as one example, platform assembly 12 includes a front lip 20 configured to connect to the front edge 54 of plate 18. In this example arrangement, front lip 20 has a generally planar rectangular shape which extends from a top edge 64 to a bottom edge 66 of front lip 20 and extends between opposing side edges 68 of front lip 20. In this example arrangement, front lip 20 includes a front side 70 positioned so that it faces away from the heating element 14 of the platform assembly 12. In this example arrangement, front lip 20 includes a rear side 72 positioned so that it faces the heating element 14 of platform assembly 12. However, any other suitable size, shape, and design is hereby contemplated for use.

In this example arrangement, front lip 20 extends towards the ground, and is positioned perpendicular to plate 18. In this example arrangement, front lip 20 is an extension of plate 18, however front lip 20 may be connected to plate 18 using various processes and means including, for example, welding, rivets, pins, clamps, bolts, screws, adhesives, chemical bonding, and/or any other process or means that results in a permanent or semi-permanent connection.

In this example arrangement, platform assembly 12 may be comprised of any number of front lips 20 depending on the number of plates 18 desired by an operator. In this example arrangement, each front lip 20 may be placed next to another front lip 20 so that the opposing side edges 68 of each front lip 20 are parallel to one another. However, any other suitable size, shape, and design is hereby contemplated for use.

Rear Lip 22:

Rear lip 22 is formed of any suitable size, shape, and design and is positioned to support platform assembly 12 and connect platform assembly 12 to a barrier 16. In the arrangement shown, as one example, platform assembly 12 includes a rear lip 22 configured to connect to the rear edge 56 of plate 18. In this example arrangement, rear lip 22 has a generally planar rectangular shape which extends from a top edge 74 to a bottom edge 76 of rear lip 22 and extends between opposing side edges 78 of rear lip 22. In this example arrangement, rear lip 22 includes a front side 80 positioned so that it faces a beating element 14 of the platform assembly 12. In this example arrangement, rear lip 22 includes a rear side 82 positioned so that it faces the barrier 16 of platform assembly 12. In this example arrangement, rear lip 22 extends towards the ground, and is positioned perpendicular to plate 18. In this example arrangement, rear lip 22 is an extension of plate 18, however rear lip 22 may be connected to plate 18 using various processes and means including, for example, welding, rivets, pins, clamps, bolts, screws, adhesives, chemical bonding, and/or any other process or means that results in a permanent or semi-permanent connection. However, any other suitable size, shape, and design is hereby contemplated for use.

In this example arrangement, platform assembly 12 may be comprised of any number of rear lips 22 depending on the number of plates 18 desired by an operator. In this example arrangement, each rear lip 22 may be placed next to another rear lip 22 so that the opposing side edges 78 of each rear lip 22 are parallel to one another. However, any other suitable size, shape, and design is hereby contemplated for use.

Support Member 24:

Support member 24 of platform assembly 12 is formed of any suitable size, shape, and design and is configured to provide support for one or more plates 18 of platform assembly 12. In the arrangement shown, as one example, support member 24 extends parallel to a barrier 16 of an animal housing facility and extends between opposing ends 84 of support member 24. In this example arrangement, support member 24 is positioned below plate 18 next to the bottom 52 of plate 18 and is positioned on the front side 80 of rear lip 22 so that rear lip 22 is positioned securely between support member 24 and barrier 16. In this example arrangement, support member 24 is positioned next to the top edge 74 of rear lip 22 and extends parallel to opposing side edges 78 of rear lip 22. However, any other suitable size, shape, and design is hereby contemplated for use.

In this example arrangement, support member 24 is configured to provide support for the various components of platform assembly 12 and allow front lip 20, plate 18, and rear lip 22 to rotate for cleaning purposes. In this example arrangement, when an operator desires to clean the various components of platform assembly 12, an operator may raise front lip 20 vertically, thereby raising plate 18 and rear lip 22. In this example arrangement, when front lip 20 is raised, the rear edge 56 of plate 18 and the top edge 74 of rear lip 22 pivot around support member 24 so that the bottom 52 of plate 18 as well as various other components of platform assembly 12 move from the deployed position 162 to the raised position 164. In this example arrangement, the raised position 164 may be desired by an operator so that the components of device 10 may be cleaned without an operator having to dissemble device 10. However, any other size, shape, design or configuration is hereby contemplated for use.

Stop Members 26:

Stop members 26 of platform assembly 12 are formed of any suitable size, shape, and design and are configured to prevent rear lip 22 from slipping and causing platform assembly 12 to fall to the ground when platform assembly 12 is rotated vertically around support member 24. In this arrangement, as one example, platform assembly 12 includes stop members 26 that extend through one or more plates 18 and support the various components of platform assembly 12. In this example arrangement, stop members 26 extend from the top 50 of plate 18 through the bottom 52 of plate 18 and towards the ground. In this example arrangement, stop members 26 are positioned between support member 24 and the front edge 54 of plate 18, and are positioned so that they are in contact with support member 24. In this example arrangement, when an operator raises platform assembly 12 so that the components of platform assembly 12 may be cleaned, platform assembly 12 is in danger of falling to the ground. In this example arrangement, stop members 26 provide support for the rear lip 22 of platform assembly 12 so that when the platform assembly 12 is raised, it does not fall. However, any other size, shape, design or configuration is hereby contemplated for use.

In this example arrangement, stop members 26 may include a lock nut 86 (not shown). In this example arrangement, an operator may use stop members 26 to position plate 18. In this example arrangement, plate 18 is placed at an angle of less than one hundred and eighty degrees in relation to the floor or ground of the animal housing facility. In this example arrangement, this angle ensures that animals located below the platform assembly 12 and heating element 14 receive heat from the heating element 14, however any other angle of plate 18 may be used. In this example arrangement, when an operator selects an angle to position plate 18, the operator may insert stop members 26 through the top 50 of plate 18 and the bottom 52 of plate 18. In this example arrangement, the operator may tighten lock nut 86 onto an end (not shown) of stop members 26 to ensure that plate 18 remains positioned at the operator's desired angle. However, any other size, shape, design or configuration is hereby contemplated for use.

In some various arrangements, stop members 26 may utilize various methods or means to support platform assembly 12 including, but not limited to, adhesive, glue, screws, bolts, clamps, pins, rivets, welding, snap connectors, friction fit connectors, chemical bonding, and/or any other process or means of secure connection to provide support. However, any other size, shape, design or configuration is hereby contemplated for use.

In this example arrangement, platform assembly 12 may be comprised of any number of stop members 26 depending on the number of plates 18 and size of platform assembly 12 desired by an operator. However, any other suitable size, shape, and design is hereby contemplated for use.

Brace 28.

Brace 28 of platform assembly 12 is formed of any suitable size, shape, and design and is configured to connect and support the plates 18 of platform assembly 12. In the arrangement shown, as one example, brace 28 has a generally planar rectangular shape which extends between opposing sides 88 and opposing ends 90. In this example arrangement, brace 28 is positioned next to the bottom 52 of one or plates 18 and extends parallel to the bottom 52 of one or more plates 18. In this example arrangement, brace 28 is positioned over the seam created when the opposing side edges 58 of plates 18 are placed next to each other. In this example arrangement, brace 28 includes one or more openings 92. In this example arrangement, brace 28 is connected to plates 18 when fasteners 94 (not shown) extend through the connection openings 62 of plate 18 and through the openings 92 of brace 28. In this example arrangement, when brace 28 is connected to plates 18, the plates 18 are supported so that they may support the weight of a heating element 14. In this example arrangement, fasteners 94 may connect brace 28 to plate 18 using various processes and means including, for example, welding, rivets, pins, clamps, bolts, screws, adhesives, chemical bonding, and/or any other process or means that results in a permanent or semi-permanent connection. However, any other suitable size, shape, and design is hereby contemplated for use.

Bracket Assembly 30:

Bracket assembly 30 is formed of any suitable size, shape, and design and is configured to connect the components of platform assembly 12 to a barrier 16 of an animal housing facility. In the arrangement shown, as one example, bracket assembly 30 includes a bracket 96 and a connection member 112. However, the embodiments are not so limited. However, any other suitable size, shape and design is hereby contemplated for use.

Bracket 96:

Bracket 96 is formed for any suitable size, shape, and design and is configured to connect the components of platform assembly 12 to a barrier 16 of an animal housing facility. In this example arrangement, bracket 96 includes a first end 98, a second end 104, and a side wall 110. In this example arrangement, the first end 98 and second end 104 of bracket 96 have a generally planar rectangular shape extending between opposing sides 100 of bracket 96 and opposing ends 106 of bracket 96. However, any other size, shape, design or configuration is hereby contemplated for use.

In this example arrangement, the first end 98 of bracket 96 includes one or more openings 102 and the second end 104 of bracket 96 also includes one or more openings 108. In this example arrangement, the one or more openings 102 of first end 98 are configured to facilitate connection between bracket 96 and a barrier 16 of an animal housing facility. In this example arrangement, the one or more openings 108 of second end 104 of bracket 96 are configured to facilitate connection between bracket 96 and support member 24, thereby connecting bracket 96 to the components of platform assembly 12. In this example arrangement, bracket 96 also includes a side wall 110 having a generally planar rectangular shape and extending between first end 98 and second end 104 of bracket 96. In this example arrangement, side wall 110 is positioned perpendicular to first end 98 and second end 104 of bracket 96 in order to facilitate bracket's 96 connection to platform assembly 12 and barrier 16. However, any other size, shape, design or configuration is hereby contemplated for use.

In this example arrangement, when fasteners 118 (not shown) extend through barrier 16 and the openings 102 of the first end 98 of bracket 96, the bracket 96 is securely fastened to the barrier 16. In this example arrangement, fasteners 118 may connect the components of the bracket 96 of bracket assembly 30 to barrier 16 using various processes and means including, for example, welding, rivets, pins, clamps, bolts, screws, adhesives, chemical bonding, and/or any other process or means that results in a permanent or semi-permanent connection. However, any other suitable size, shape, and design is hereby contemplated for use.

Connection Member 112:

Connection member 112 is formed for any suitable size, shape, and design and is configured to extend around support member 24 and connect the components of platform assembly 12 securely to a barrier 16 of an animal housing facility. In this example arrangement, connection member 112 has two ends 114 having one or more openings 116. In this example arrangement, connection member 112 is in the shape of a semi-circle and extends around support member 24, however any other shape of connection member 112 is hereby contemplated including but not limited to, a square, a rectangle, or any other shape or design. However, any other suitable size, shape, and design is hereby contemplated for use.

In this example arrangement, the openings 116 of the ends 114 of the connection member 112 correspond to the openings 108 of the second end 104 of bracket 96. In this example arrangement, when fasteners 118 extend through openings 116/108, fasteners 118 thereby securely position support member 24 between connection member 112 and bracket 96. In this example arrangement, when support member 24 is connected to bracket 96 of bracket assembly 30, the rear lip 22 of platform assembly 12 is securely positioned or wedged between support member 24 and barrier 16. In this example arrangement, the secure connection created by bracket assembly 30 allows platform 12 to rotate vertically. In this example arrangement, fasteners 118 may connect the components of bracket assembly 30 to barrier 16 using various processes and means including, for example, welding, rivets, pins, clamps, bolts, screws, adhesives, chemical bonding, and/or any other process or means that results in a permanent or semi-permanent connection. However, any other suitable size, shape, and design is hereby contemplated for use.

Diffuser Assembly 32:

Diffuser assembly 32 is formed of any suitable size, shape, and design and is configured to be positioned below a heating element 14 and prevent heat from the heating element 14 from becoming too concentrated. In the arrangement shown, as one example, a heating element 14 may produce heat that is concentrated in the center of the area located below the heating element 14, creating an area below the heating element 14 which may be too warm for animals. In this example arrangement, the diffuser assembly 32 is configured to prevent an area below the heating element 14 from becoming too warm for animals. In this example arrangement, the diffuser assembly 32 includes a first disk 120, a second disk 124, a plate 128, and fasteners 138. However, the embodiments are not so limited. However, any other suitable size, shape and design is hereby contemplated for use.

First Disk 120:

First disk 120 is formed of any suitable size, shape, and design and is configured to diffuse the heat produced near the center of an area below a heating element 14. In this example arrangement, first disk 120 is a generally circular member that is slightly smaller than second disk 124. In this example arrangement, the first disk 120 of the diffuser assembly 32 includes one or more openings 122. In this example arrangement, the one or more openings 122 of first disk 120 are configured to facilitate connection between first disk 120 and the components of diffuser assembly 32. However, any other size, shape, design or configuration is hereby contemplated for use.

Second Disk 124:

Second disk 124 is formed of any suitable size, shape, and design and is configured to diffuse the heat produced near the center of an area below a heating element 14. In this example arrangement, second disk 124 is a generally circular member that is slightly larger than first disk 120 and positioned below first disk 120. In this example arrangement, the second disk 124 of the diffuser assembly 32 includes one or more openings 126. In this example arrangement, the one or more openings 126 of second disk 124 are configured to facilitate connection between second disk 124 and the components of diffuser assembly 32. However, any other size, shape, design or configuration is hereby contemplated for use.

Plate 128:

Plate 128 is formed for any suitable size, shape, and design and is configured to connect diffuser assembly 32 to a beating element 14. In this example arrangement, diffuser assembly 32 includes a plate 128 configured to connect the diffuser assembly 32 to the bottom 52 of one or more plates 18. In this example arrangement, plate 128 has a generally planar rectangular shape which extends between opposing ends 132 of plate 128 and opposing sides 134 of plate 128. In this example arrangement, plate 128 extends across the bottom of a heating element 14 and is configured to position the first disk 120 and the second disk 124 below beating element 14 so that heat from the heating element 14 can be diffused before reaching an animal. In this example arrangement, plate 128 includes one or more openings 130 positioned on the opposing ends 132 of plate 128 and the center of plate 128. In this example arrangement, when fasteners 136 extend through openings 130 positioned on the ends of plate 128 and extend through plate 18, the diffuser assembly 32 is connected to the platform assembly 12. Further, in this example arrangement, when fasteners 138 extend through openings 130 in the center of plate 128, openings 126 in second disk 124, and openings 122 in first disk. 120, the components of diffuser assembly 32 are connected to one another. In this example arrangement, fasteners 136 of plate 128 and fasteners 138 of diffuser assembly 32 may include various processes and means including, for example, welding, rivets, pins, clamps, bolts, screws, adhesives, chemical bonding, and/or any other process or means that results in a permanent or semi-permanent connection. However, any other suitable size, shape, and design is hereby contemplated for use.

In this example arrangement, device 10 may be comprised of any number of diffuser assemblies 32 depending on the number of plates 18 and heating elements 14 desired by an operator. However, any other suitable size, shape, and design is hereby contemplated for use.

Clip Assembly 34:

Clip assembly 34 is formed of any suitable size, shape, and design and is configured to connect heating element 14 to plate 18 of platform assembly 12 to prevent heating element 14 from being displaced due to heating element 14 being bumped or due to the angle of plate 18 relative to the ground. In this example arrangement, the clip assembly 34 includes a fastener 140, a wing nut 142, a plate 144, and a bracket 152. However, the embodiments are not so limited. However, any other suitable size, shape and design is hereby contemplated for use.

Plate 144:

Plate 144 is formed of any suitable, size, shape, and design and is configured to connect heating element 14 to plate 18 of platform assembly 12. In this example arrangement, plate 144 has a generally planar rectangular shape which extends between opposing ends 146 of plate 144 and opposing sides 148 of plate 144. In this example arrangement, plate 144 extends across the bottom 52 of plate 18 with one opposing end 146 located at an edge of opening 60 of plate 18. In this example arrangement, plate 144 includes one or more openings 150 positioned on the opposing ends 146 of plate 144. In this example arrangement, the one or more openings 150 are configured to connect the clip assembly 34, the plate 18 of the platform assembly 12, and the heating element 14. However, any other suitable size, shape, and design is hereby contemplated for use.

Bracket 152:

Bracket 152 is formed of any suitable, size, shape, and design and is configured to connect heating element 14 to plate 18 of platform assembly 12. In this example arrangement, bracket 152 extends between opposing ends 154 and includes a top 156 positioned between the opposing ends 154. In this example arrangement, top 156 extends between opposing sides 158 and includes an opening 160 configured to facilitate connection between a heating element 14 and plate 18 of platform assembly 12. In this example arrangement, bracket 152 is u-shaped, however, any other shape or design of bracket 152 is hereby contemplated which facilitates connection between a heating element 14 and plate 18 of platform assembly 12. In this example arrangement, bracket 152 extends across the top 50 of plate 18 with one opposing end 154 located at an edge of opening 60 of plate 18 of platform assembly 12. However, any other suitable size, shape, and design is hereby contemplated for use.

In this example arrangement, clip assembly 34 includes a fastener 140. In this example arrangement, when fastener 140 is used in connection with a wing nut 142 and extends through an opening 150 of plate 144, through the bottom 52 of plate 18, and through an opening 160 in a top 156 of bracket 152, a heating element 14 is securely fastened to the platform assembly 12. In this example arrangement, fastener 140 of clip assembly 34 may include various processes and means including, for example, a wing nut, welding, rivets, pins, clamps, bolts, screws, adhesives, chemical bonding, and/or any other process or means that results in a permanent or semi-permanent connection. However, any other suitable size, shape, and design is hereby contemplated for use.

In this example arrangement, device 10 may be comprised of any number of clip assemblies 34 depending on the number of heating elements 14 desired by an operator. However, any other suitable size, shape, and design is hereby contemplated for use.

Heating Element 14:

Heating element 14 is formed of any suitable size, shape, and design and is configured to heat an area when operated to facilitate, for example, care of livestock. In the arrangement shown, as one example, device 10 includes a heating element 14 positioned above platform assembly 12 so that animals positioned below platform assembly 12 may be warmed. In this example arrangement, heating element 14 may be formed of various materials including, but not limited to, for example, wood, plastic, metals, composite materials, polymers, resins, textiles, composites, and/or any other natural or synthetic materials. However, any other size, shape, design or configuration is hereby contemplated for use.

Barrier 16:

Barrier 16 is formed of any suitable size, shape, and design and is configured to connect to platform assembly 12 and facilitate, for example, a defined area for livestock. In the arrangement shown, as one example, device 10 includes a barrier 16 that connects to platform assembly 12 so that animals positioned below platform assembly 12 and next to barrier 16 may be warmed. In this example arrangement, barrier 16 is comprised of metal materials. However, it is contemplated that the components of barrier 16 may be constructed of any type of material including, but not limited to wood, plastic, metals, and/or composite materials. However, any other size, shape, design or configuration is hereby contemplated for use.

In Operation:

In operation, device 10 is configured to provide a warm environment for animals. In this example arrangement, device 10 is configured to move between a deployed position 162 and a raised position 164. When device 10 is in the deployed position 162, rear lip 22 is securely positioned between a barrier 16 of an animal housing facility and support member 24. As such, support member 24 provides support for rear lip 22 and rear lip 22 provides support for the other various components of platform assembly 12 when device 10 is in the deployed position 162, which allows device 10 to provide a heated environment for animals. When an operator wants to clean the various components of device 10, the operator may lift the components of platform assembly 12 vertically. When the components of platform assembly 12 are lifted vertically, the rear edge 56 of plate 18 and the top edge 74 of rear lip 22 pivot around support member 24 so that the bottom 52 of plate 18 as well as various other components of platform assembly 12 move from the deployed position 162 to the raised position 164. Therefore, the components of device 10 may be cleaned easily without an operator having to dissemble device 10.

Further in operation, device 10 is configured to provide a customizable method of organizing and holding heating elements 14 used in animal heating facilities. In this example arrangement, an operator may desire any number of heating elements 14 depending on the size and shape of the animal housing facility that the operator is using. As such, an operator may desire any number of plates 18 to hold the desired number of heating elements 14. When an operator chooses the size and shape that the operator would like to use to display the heating elements 14, the operator may attach any number of plates 18 to a barrier 16 of an animal housing facility. The various components of the platform assembly 12 may also be organized in any manner desired by an operator. Therefore, the system may be used in various animal housing facilities to display various heating elements 14 and provide a warm environment for animals located in an animal housing facility.

Alternative Arrangement:

With reference to FIGS. 39-42 an alternative arrangement of device 10 is presented. This alternative arrangement presented in FIGS. 39-42 is similar to the device 10 presented in FIGS. 1-38 and therefore unless specifically stated otherwise herein, the prior teaching and disclosure shown in FIGS. 1-38 applies equally to the alternative arrangement shown in FIGS. 39-42. That is, the arrangement shown in FIGS. 39-42 is configured to be used with the same or similar platform assembly 12, heating element 14, barrier 16, and the like with the primary difference relating to the arrangement of one or more plates 18 of the platform assembly 12 as is described herein.

Plate 18:

In the arrangement shown in FIGS. 39-42, as one example, plate 18 is formed of any suitable size, shape, and design and is configured to provide support for a heating element 14. In the arrangement shown, as one example, platform assembly 12 includes one or more plates 18 having a generally planar rectangular shape which extends from a front edge 54 to a rear edge 56 and extends between opposing side edges 58. In this example arrangement, one or more plates 18 also include a top 50 and a bottom 52. In this example arrangement, platform assembly 12 includes one or more corner plates 166 having a generally planar rectangular shape which extends from a front corner 168 to a cut out 170 and extends between side edges 172. In this example arrangement, corner plate 166 includes an opening 60 and connection openings 62 that extend through the top 174 of corner plate 166 to the bottom 176 of corner plate 166. In this example arrangement, the opening 60 of the corner plate 166 is positioned in the center section of corner plate 166 and is configured to correspond to various sizes and shapes of heating elements 14 of device 10, including but not limited to, a circle, a square, a rectangle, or a triangle. In this example arrangement, the opening 60 is configured to allow heat from a heating element 14 to warm animals in an animal housing facility. In this example arrangement, platform assembly 12 includes a first plate 18 and a second plate 18 positioned next to adjacent side edges 172 of the corner plate 166. In this example arrangement, this configuration of the one or more plates 18 and the use of corner plate 166 allows platform assembly 12 to fit in a corner of an animal housing facility. In this example arrangement, platform assembly 12 may be comprised of any number of plates 18 depending on the configuration desired by an operator. In this example arrangement, a first plate 18 may be placed next to corner plate 166 so that one of the opposing side edges 58 of the first plate 18 is parallel to a side edge 172 of corner plate 166. In this example arrangement, a second plate 18 may be placed next to a side edge 172 of corner plate 166 so that the first plate 18 and second plate 18 are positioned next to adjacent side edges 172 of corner plate 166 and so that the opposing side edges 58 of first plate 18 and second plate 18 extend perpendicularly to one another. Additionally, in this example arrangement, each plate 18 and corner plate 166 of platform assembly 12 may support one or more heating elements 14 positioned on the top 50 of plate 18 and the top 174 of corner plate 166. However, any other suitable size, shape, and design is hereby contemplated for use.

In this example arrangement, corner plate 166 also includes a cut out 170 and a rear lip 178. In this example arrangement, cut out 170 is configured to facilitate the connection between platform assembly 12 and a barrier 16. Further, in this example arrangement, rear lip 178 extends towards the ground, and is positioned perpendicular to corner plate 166. In this example arrangement, rear lip 178 is an extension of corner plate 166 and is configured to support platform assembly 12 when it is connected to a barrier 16 using one or more support members 24. In this example arrangement, rear lip 178 may be connected to corner plate 166 using various processes and means including, for example, welding, rivets, pins, clamps, bolts, screws, adhesives, chemical bonding, and/or any other process or means that results in a permanent or semi-permanent connection. However, any other suitable size, shape, and design is hereby contemplated for use.

From the above discussion it will be appreciated that the animal warming device presented herein improves upon the state of the art. More specifically, and without limitation, it will be appreciated that in one or more arrangements a device is presented: that is safe to use; that is less susceptible to damage; that provides more uniform heat distribution; that is configured for use in livestock operations; that is easy to deploy; that is easy to install; that has a long useful life; that is durable; that has a robust design; that is easy to use; and/or that is high quality. Example embodiments of the invention have been described in an illustrative manner. It is to be understood that the terminology that has been used is intended to be in the nature of words of description rather than of limitation. It will be appreciated by those skilled in the art that other various modifications could be made to the device without parting from the spirit and scope of this disclosure. All such modifications and changes fall within the scope of the claims and are intended to be covered thereby.

What is claimed:

1. An animal warming device, comprising:
a platform assembly; the platform assembly having a front side and a rear side, a left side and a right side, a top side and a bottom side; the platform assembly having a first plate; the first plate having an opening; a heating element; wherein the heating element is operatively connected to the first plate adjacent the opening; a diffuser assembly; wherein the diffuser assembly is fastened to the bottom side of the platform assembly such that the diffuser assembly is operatively connected to the first plate adjacent the opening; wherein the diffuser assembly is configured to diffuse heat from the heating element; wherein the diffuser assembly is comprised of a first disk axially spaced from and positioned below the heating element in approximately a geometric center of the heating element; a second plate; the second plate connected adjacent the left side of the first plate; a third plate; the third plate connected adjacent the right side of the first plate; wherein the first plate has a front lip and a rear lip; wherein the second plate has a front lip and a rear lip; wherein the third plate has a front lip and a rear lip; wherein the animal warming device is installed on a barrier of an animal housing facility by placing the rear lip of the first plate, the second plate, and the third plate over a support member connected to the barrier such that the rear lip of the first plate, the second plate, and the third plate is positioned between the barrier and the support member.

2. The device of claim 1, wherein the heating element is connected to the first plate by a plurality of clips.

3. The device of claim 1, wherein the second plate is connected to the first plate by a brace.

4. The device of claim 1, wherein the third plate is connected to the first plate by a brace.

5. The device of claim 1, wherein the animal warming device is configured to rotate between a deployed position and a raised position.

6. The device of claim 1, wherein when the animal warming device is in a deployed position, a rear side of the rear lip of the first plate, the second plate, and the third plate rests against the barrier, and a front side of the rear lip of the first plate, the second plate, and the third plate rests against the support member.

7. The device of claim 1, wherein when the animal warming device is in a deployed position, the rear lip of the first plate, the second plate, and the third plate is wedged between the barrier and the support member.

8. The device of claim 1, the platform assembly further comprising a plurality of stop members, wherein when the animal warming device is in a raised position, the plurality of stop members prevent the animal warming device from slipping between the barrier and the support member.

9. The device of claim 1, the platform assembly further comprising a plurality of stop members, wherein when the animal warming device is in a raised position, the plurality of stop members engage the support member which supports the animal warming device in the raised position.

10. The device of claim 1, wherein when the animal warming device is in a deployed position the platform assembly is approximately horizontal.

11. The device of claim 1, wherein when the animal warming device is in a raised position the platform assembly is approximately vertical.

12. The device of claim 1, wherein the first plate has a center section that is generally flat and planar in shape.

13. The device of claim 1, wherein the front lip of the first plate is generally flat and planar in shape.

14. The device of claim 1, wherein the rear lip of the first plate is generally flat and planar in shape.

15. The device of claim 1, wherein the first plate has a center section that is generally flat and planar in shape; wherein the front lip of the first plate is generally flat and planar in shape, and wherein the plane of the center section extends approximately perpendicularly to the plane of the front lip.

16. The device of claim 1, wherein the first plate has a center section that is generally flat and planar in shape; wherein the rear lip of the first plate is generally flat and planar in shape, and wherein the plane of the center section extends approximately perpendicularly to the plane of the rear lip.

17. The device of claim 1, wherein the diffuser assembly functions to prevent an area below the heating element from becoming too warm for an animal.

18. The device of claim 1 wherein the diffuser assembly further comprises a second disk axially spaced from the first disk, wherein the first disk is positioned between the heating element and the second disk.

19. The device of claim 18 wherein the diffuser assembly is further defined such that a diameter of the first disk is less than a diameter of the second disk.

\* \* \* \* \*